US006662286B2

(12) United States Patent
Kusakabe et al.

(10) Patent No.: US 6,662,286 B2
(45) Date of Patent: *Dec. 9, 2003

(54) INFORMATION PROCESSING METHOD AND INFORMATION PROCESSING APPARATUS

(75) Inventors: Susumu Kusakabe, Tokyo (JP); Masayuki Takada, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,170

(22) PCT Filed: Jun. 24, 1997

(86) PCT No.: PCT/JP97/02175

§ 371 (c)(1),
(2), (4) Date: Jul. 1, 1998

(87) PCT Pub. No.: WO98/00808

PCT Pub. Date: Jan. 8, 1998

(65) Prior Publication Data

US 2002/0026564 A1 Feb. 28, 2002

(30) Foreign Application Priority Data

Jun. 28, 1996 (JP) .............................................. 8-168966

(51) Int. Cl.[7] .............................................. G06F 12/16
(52) U.S. Cl. ........................ 711/170; 711/171; 711/172; 711/173; 711/202; 711/203; 711/204; 711/205; 711/206
(58) Field of Search ..................... 711/1, 4, 5, 101–105, 711/147–153, 170–173, 202–209

(56) References Cited

U.S. PATENT DOCUMENTS

| 4,365,295 | A | * | 12/1982 | Katzman et al. ............. 711/206 |
| 4,654,819 | A | * | 3/1987 | Stiffler et al. ................ 165/115 |
| 4,800,520 | A | * | 1/1989 | Iijima .......................... 711/173 |
| 4,827,512 | A | * | 5/1989 | Hirokawa et al. ............. 380/23 |
| 4,833,595 | A | * | 5/1989 | Iijima .......................... 711/170 |
| 4,839,792 | A | * | 6/1989 | Iijima .......................... 235/380 |
| 4,887,234 | A | * | 12/1989 | Iijima .......................... 711/173 |
| 5,712,740 | A | * | 1/1998 | Kikuchi et al. ............... 360/48 |
| 5,854,942 | A | * | 12/1998 | Penokie ....................... 710/10 |
| 5,996,054 | A | * | 11/1999 | Ledain et al. ............... 709/321 |

FOREIGN PATENT DOCUMENTS

| JP | 57-30061 | 2/1982 |
| JP | 59-188896 | 10/1984 |
| JP | 61-151897 | 7/1986 |
| JP | 63-249284 | 10/1988 |
| JP | 4-40587 | 2/1992 |
| JP | 4-296953 | 10/1992 |
| JP | 7-281962 | 10/1995 |
| JP | 8-287697 | 11/1996 |

* cited by examiner

*Primary Examiner*—T. V. Nguyen
(74) *Attorney, Agent, or Firm*—Bell, Boyd & Lloyd LLC

(57) ABSTRACT

Memory corruption can be suppressed. When data stored in a random access area are read, the read data (physical block) are retrieved by a logic block number and newest data are read by referring to an incremental counter of data having that logic block number. When data are stored in the random access area, the incremental counter and the logic block number of data already stored in the random access area are referred and a physical block set to be unnecessary is set to a writer buffer, and then the data are written to this write buffer.

4 Claims, 21 Drawing Sheets

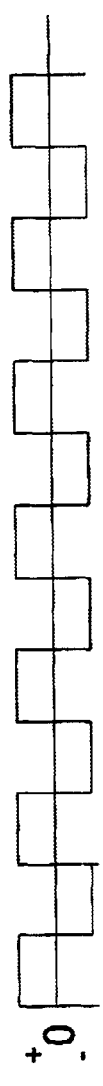
FIG. 16A BPSK CARRIER WAVE
FIG. 16B ONE EXAMPLE OF DATA
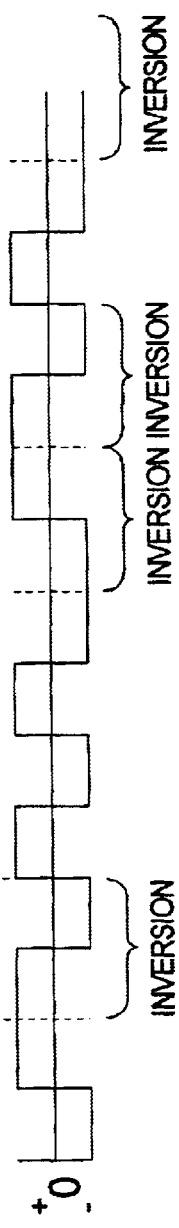
FIG. 16C MODULATING WAVE (DIFFERENTIAL CONVERSION)

INFORMATION PROCESSING METHOD AND INFORMATION PROCESSING APPARATUS

TECHNICAL FIELD

The present invention relates to an information processing method and an information processing apparatus, and particularly relates to an information processing method and an information processing apparatus for receiving a command from a predetermined user and processing this command and transmitting processed results thereof.

BACKGROUND ART

An IC card (smart card) utilized in an electronic money system and a security system is developed.

A CPU for performing various kinds of processings, a memory for storing data required in these processings, etc. are built-in such an IC card and data are transmitted and received in a state in which the card comes in contact with a predetermined reader/writer (R/W).

There is also an IC card of a batteryless type itself having no battery among the IC cards. An electric power is supplied from the reader/writer (R/W) to such an IC card of the batteryless type.

However, such an IC card is used as a premise in a state in which the IC card comes in contact with the reader/writer (R/W). Accordingly, when the IC card is used in a noncontact fashion, a problem exists in that it is difficult for the IC card to obtain an electric power.

It may be also considered that a non-contact type IC card transits and receives data by utilizing an electromagnetic wave in a noncontact fashion between the IC card and the reader/writer (R/W) and an electric power required for the IC card is supplied by this electromagnetic wave. In such a method, the IC card can not obtain a sufficient electric power when a receiving state of the electromagnetic wave becomes bad while the card gets access to its built-in memory. Therefore, a problem exists in that there is a possibility of causing a defect in matching of data in the memory (memory corruption is caused).

Further, an area proportional to the size of an area for storing data is required to manage the data when information is held every storing unit of the data (every sector in the case of an MS-DOS(Microsoft-Disc Operating System)) as in a FAT (File Allocation Table) of the MS-DOS. Accordingly, there is a problem of a reduction in utilization efficiency of the memory. Further, when the memory area is managed in a predetermined storing unit of the data and data having a size smaller than this unit are stored, problems exist in that an unused memory area is caused and utilization efficiency of the memory is reduced further.

Further, since uniform processing is performed with respect to the reader/writer (R/W) in the above IC card, a problem exists in that it is difficult to perform individual processings corresponding to plural readers/writers.

The present invention is made in consideration of such situations. The present invention utilizes a memory section including a first area for storing data of plural users and a second area used by said plural users stored in said first area and managed in a physical block unit having a predetermined size. A logic block number is allocated to data stored in that physical block. The data are stored in a physical block except for the physical block storing the data having that logic block number. A number corresponding to a storing order is allocated to the data stored in the physical block. When the physical block having a final number is a final physical block, the data are stored in a leading physical block. In contrast to this, when the physical block having the final number is the final physical block, the data are stored in a physical block next to the physical block having the final number. Thus, the occurrence of memory corruption in a memory is logically restrained.

Further, in the present invention, numbers corresponding to the leading and final physical blocks of an area used by each of the users are held so that data can be managed by an information amount (the numbers corresponding to the leading and final physical blocks) proportional to the number of users instead of a size of the area used by each of the users.

Further, in the present invention, plural data for prescribing a predetermined area in the second area and respective different access rights are stored in the first area in the above memory section in accordance with one user. The data for prescribing the predetermined area in the second area are stored in the first area in accordance with plural users. Thus, individual processings can be performed in accordance with the plural users (R/W).

DISCLOSURE OF THE INVENTION

An information processing method according to claim 1 is characterized by including a step for receiving a command from a predetermined user, a step for processing the command by utilizing a memory section including a first area for storing data of one user or more and a second area used by one user or more stored in the first area and set in a vacant area unused as the first area, and a step for transmitting results of the processing.

An information processing apparatus according to claim 3 is characterized by including a receiving means for receiving a command from a predetermined user, a memory means including a first area for storing data of one user or more and a second area used by one user or more stored in the first area and set in a vacant area unused as the first area, a processing means for processing the command by utilizing the memory means, and a transmitting means for transmitting results of the processing.

An information processing method according to one embodiment is characterized in that the processing means comprises a step for allocating a logic block number to data stored in the physical block the memory means comprises, and a step for storing new data having a predetermined logic block number in a physical block except for the physical block storing the data having that logic block number.

An information processing apparatus according to another embodiment is characterized by comprising a receiving means for receiving a command from a predetermined user, a processing means for processing the command, a transmitting means for transmitting results of the processing, and a memory means including a first area for storing data of one user or more and a second area used by one user or more stored in the first area and managed in a physical block unit having a predetermined size, and in that the processing means allocates a logic block number to data stored in the physical block; and the memory means stores new data having a predetermined logic block number in a physical block except for the physical block storing the data having that logic block number.

An information processing method according to a further embodiment is characterized in that the data of a predetermined block of the second area have a recognition number, and the processing means compares a recognition number given by the command supplied from the user with the recognition number given by the data so as not to repeatedly process the same command.

An information processing apparatus according to one embodiment is characterized by including a receiving means for receiving a command from a predetermined user, a processing means for processing the command, a transmitting means for transmitting results of the processing, and a memory means including a first area for storing data of one user or more and a second area used by one user or more stored in the first area and managed in a block unit having a predetermined size, and in that the data of a predetermined block of the second area of the memory means have a recognition number, and the processing means compares a recognition number given by the command supplied from the user with the recognition number given by the data so as not to repeatedly process the same command.

An information processing method according to another embodiment is characterized in that the processing means includes a step for allocating a number corresponding to a storing order to the data stored in the block, and a step, in the memory means storing numbers corresponding to the leading and final blocks of an area used by the user in the first area, for storing new data in a leading block when a block having a final number is a final block, and storing the new data in a block next to the block having the final number when the block having the final number is not the final block.

An information processing apparatus according to a further embodiment is characterized by comprising a receiving means for receiving a command from a predetermined user, a processing means for processing the command, a transmitting means for transmitting results of the processing, and a memory means including a first area for storing data of one user or more and a second area used by one user or more stored in the first area and managed in a block unit having a predetermined size, and in that the processing means allocates a number corresponding to a storing order to data stored in the block, and the memory means stores numbers corresponding to the leading and final blocks of an area used by the user in the first area, and stores new data to the leading block when a block having the final number is the final block, and also stores the new data in a block next to the block having the final number when the block having the final number is not the final block.

An information processing method according to one embodiment is characterized by including a step for receiving a command from a predetermined user, a step for processing the command by utilizing a memory section including a first area for storing data of one user or more and a second area used by one user or more stored in the first area and managed in a block unit having a predetermined size and storing plural data for respectively prescribing different access rights to one user in a predetermined area of the second area in the first area; and a step for transmitting results of the processing.

An information processing apparatus according to another embodiment is characterized by including a receiving means for receiving a command from a predetermined user, a processing means for processing the command, a transmitting means for transmitting results of the processing, and a memory means including a first area for storing data of one user or more and a second area used by one user or more stored in the first area and managed in a block unit having a predetermined size, and in that the memory means stores plural data for respectively prescribing different access rights to one user and a predetermined area in the second area in the first area.

An information processing method according to a further embodiment is characterized by including a step for receiving a command from a predetermined user, a step for processing the command by utilizing a memory section including a first area for storing data of plural users and a second area used by the plural users stored in the first area and managed in a block unit having a predetermined size, and storing data for using a predetermined area in the second area by the plural users in cooperation with each other in the first area, and a step for transmitting results of the processing.

An information processing circuit according to one embodiment is characterized by comprising a receiving means for receiving a command from a predetermined user, a processing means for processing the command, a transmitting means for transmitting results of the processing, and a memory means including a first area for storing data of plural users and a second area used by the plural users stored in the first area and managed in a block unit having a predetermined size, and in that the memory means stores data for using a predetermined area in the second area by the plural users in cooperation with each other in the first area.

An information processing method according to another embodiment is characterized by including a step for receiving a command from a predetermined user, a step for processing the command by utilizing a memory section including a first area for storing data of plural users and a second area used by the plural users stored in the first area and managed in a block unit having a predetermined size, and storing plural data for respectively prescribing different access rights to the plural users and a predetermined area in the second area in the first area, and a step for transmitting results of the processing.

An information processing apparatus according to one embodiment is characterized by including a receiving means for receiving a command from a predetermined user, a processing means for processing the command, a transmitting means for transmitting results of the processing, and a memory means including a first area for storing data of plural users and a second area used by the plural users stored in the first area and managed in a block unit having a predetermined size, and in that the memory means stores plural data for respectively prescribing different access rights to the plural users and a predetermined area in the second area in the first area.

In the information processing method according to claim 1, a command is processed by utilizing a memory section including a first area for storing data of one user or more and a second area used by one user or more stored in the first area and set in a vacant area unused as the first area.

In the information processing apparatus according to claim 3, the processing means processes the command by utilizing the memory means including a first area for storing data of one user or more and a second area used by one user or more stored in the first area and set in a vacant area unused as the first area.

In the information processing method according to another embodiment, the processing means allocates a logic block number to data stored in the physical block, and the memory means stores new data having a predetermined logic block number to a physical block except for the physical block storing the data having that logic block number.

In the information processing apparatus according to a further embodiment, the processing means allocates a logic block number to data stored in the physical block, and the memory means stores new data having a predetermined logic block number to a physical block except for the physical block storing the data having that logic block number.

In the information processing method according to another embodiment, the data of a predetermined block in the second area have a recognition number, and the processing means compares a recognition number given by the command supplied from the user with the recognition number given by the data so as not to repeatedly process the same command.

In the information processing apparatus according to one embodiment, the data of a predetermined block in the second area of the memory means have a recognition number, and the processing means compares a recognition number given by the command supplied from the user with the recognition number given by the data so as not to repeatedly process the same command.

In the information processing method according to another embodiment, the processing means allocates a number corresponding to a storing order to data stored in the block. The memory means stores new data to a leading block when a block having a final number is a final block, while stores the new data to a block next to the block having the final number when the block having the final number is not the final block.

In the information processing apparatus according to a further embodiment, the processing means allocates a number corresponding to a storing order to data stored in the block. The memory means stores numbers corresponding to the leading and final blocks of an area used by the user in the first area, and stores new data to the leading block when a block having the final number is the final block, while stores the new data to a block next to the block having the final number when the block having the final number is not the final block.

In the information processing apparatus according to another embodiment, the command is processed by utilizing a memory section including a first area for storing data of one user or more and a second area used by one user or more stored in the first area and managed in a block unit having a predetermined size, and storing plural data for respectively prescribing different access rights to one user and a predetermined area in the second area in the first area.

In the information processing apparatus according to a further embodiment, the memory means stores plural data for respectively prescribing different access rights to one user and a predetermined area in the second area in the first area.

In the information processing method according to another embodiment, the command is processed by utilizing a memory section including a first area for storing data of plural users and a second area used by the plural users stored in the first area and managed in a block unit having a predetermined size, and storing data for using a predetermined area in the second area by the plural users in cooperation with each other a in the first area.

In the information processing apparatus according to one embodiment, the memory means stores data for using a predetermined area in the second area by the plural users in cooperation with each other in the first area.

In the information processing method according to another embodiment, the command is processed by utilizing a memory section including a first area for storing data of plural users and a second area used by the plural users stored in the first area and managed in a block unit having a predetermined size, and storing plural data for respectively prescribing different access rights to the plural users and a predetermined area in the second area in the first area.

In the information processing apparatus according to a further embodiment, the memory means stores plural data for respectively prescribing different access rights to the plural users and a predetermined area in the second area in the first area.

BRIEF DESCRIPTION OF DRAWINGS

FIGS. 16A–16C are views showing one example of BPSK modulation;

BEST MODE FOR CARRYING OUT THE INVENTION

Figure 1:
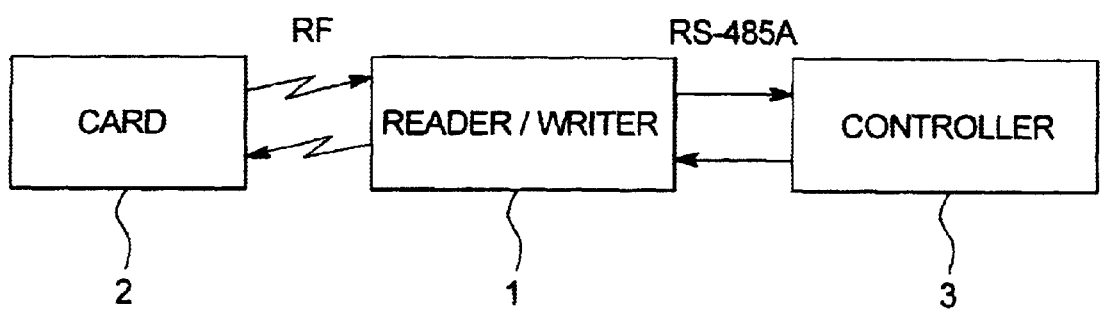
FIG. 1 is a block diagram showing one example of a noncontact card system utilizing an IC card 2 in one embodiment of an information processing apparatus according to the present invention.

FIG. 1 shows one example of a noncontact card system utilizing a reader/writer R/W 1 and an IC card 2. The R/W 1 and the IC card 2 transmit and receive data in a noncontact fashion by utilizing an electromagnetic wave.

When the R/W 1 transmits a predetermined command to the IC card 2, the IC card 2 is set to receive that command and perform processing corresponding to that command.

When the R/W 1 transmits data to the IC card 2, the IC card 2 as one embodiment of an information processing apparatus of the present invention is set to receive that command, process the received command and transmit responsive data corresponding to its processed results to the R/W 1.

The R/W 1 is connected to a controller 3 through a predetermined interface (for example, RS-485A) and is supplied with a predetermined control signal from the controller 3 to perform processing according to the control signal.

Figure 2:
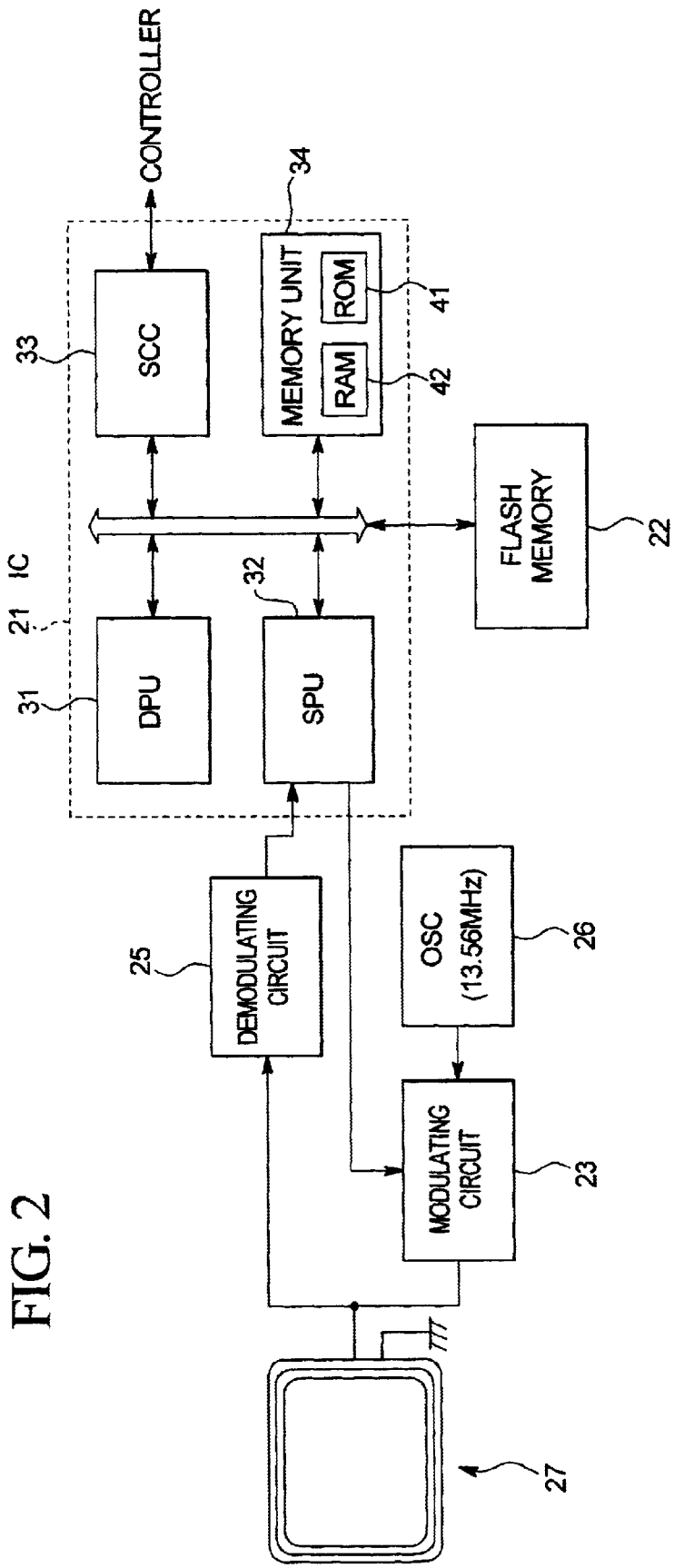
FIG. 2 is a block diagram showing a constructual example of a reader/writer 1 shown in FIG. 1.

FIG. 2 shows the construction of the R/W 1.

In an IC 21, a DPU (data processing unit) 31, an SPU (signal processing unit) 32, an SCC (signal communication controller) 33, and a memory section comprising of a ROM section 41 and a RAM section 42 are connected to each other through a bus. The DPU processes data. The SPU processes data transmitted to the IC card 2 and data received from the IC card. The SCC 33 communicates with the controller 3. The ROM section stores information required for the processing of data in advance. The RAM section 42 for temporarily stores data which are being processed.

A flash memory 22 for storing predetermined data is also connected to the bus.

The DPU 31 is set to output a command transmitted to the IC card 2 to the SPU 32 and receive responsive data received from the IC card 2 through the SPU 32.

The SPU 32 performs a predetermined processing (for example, BPSK (BiPhase Shift Keying) modulation (described later)) with respect to a command to be transmitted to the IC card 2. Thereafter, the SPU is set to output processed data to a modulating circuit 23 and receive responsive data transmitted by the IC card 2 from a demodulating circuit 25 and perform a predetermined processing with respect to the data.

The modulating circuit 23 is set to ASK(Amplitude Shift Keying)-modulate a carrier wave of a predetermined frequency (e.g., 13.56 MHz) supplied from an oscillator 26 by data supplied from the SPU 32 and output the generated modulating wave to the IC card 2 as an electromagnetic wave through an antenna 27. At this time, the modulating circuit 23 sets a modulating degree to be smaller than one and performs the ASK modulation. Namely, a maximum amplitude of the modulating wave is set such that this maximum amplitude does not become zero even when data shows a low level.

The demodulating circuit 24 is set to demodulate the modulating wave (ASK modulating wave) received through the antenna 27 and output the demodulated data to the SPU 32.

Figure 3:
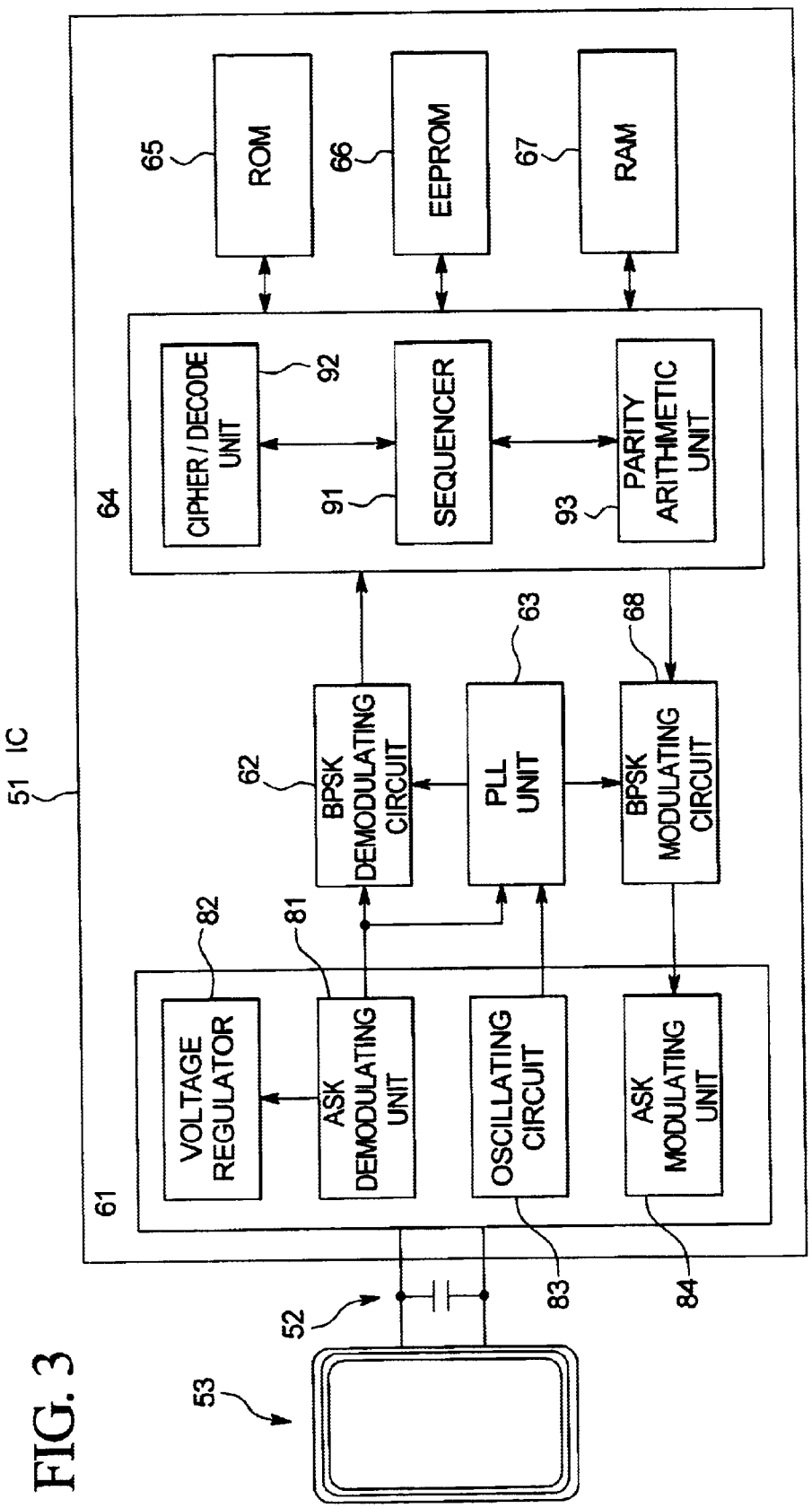
FIG. 3 is a block diagram showing the construction of the IC card 2 in one embodiment of the information processing apparatus according to the present invention.

FIG. 3 shows a constructual example of the IC card 2 according to one embodiment of the present invention. In this IC card 2, an IC 51 is set to receive a modulating wave transmitted by the R/W 1 through an antenna 53. A capacitor 52 constructs an LC circuit together with the antenna 53 and is set to be tuned to an electromagnetic wave of a predetermined frequency (carrier frequency).

In the IC 51, an RF interface section 61 (a signal receiving means, a signal transmitting means) detects and demodulates the modulating wave (ASK modulating wave) received through the antenna 53 in an ASK demodulating section 81, and outputs demodulated data to a BPSK demodulating circuit 62 and a PLL (Phase Locked Loop) section 63. Further, a signal detected by the ASK demodulating section 81 is stabilized by a voltage regulator 82 and then is supplied to each circuit as a direct current power.

The RF interface section 61 is set to oscillate a frequency signal same as a clock frequency of data by its oscillating circuit 83 and output that signal to the PLL section 63.

Then, the ASK modulating section 81 of the RF interface section 61 changes a load of the antenna 53 as a power source of the IC card 2 in accordance with data supplied from an arithmetic section 64 (a processing means) (For example, a predetermined switching element is turned on/off in accordance with data and a predetermined load is connected in parallel to the antenna 53 only when the switching element is turned on). Thus, the ASK modulating section 81 is set to ASK-modulate the modulating wave (a maximum amplitude of the modulating wave is set to be constant when data are transmitted from the IC card 2) received through the antenna 53, and transmit a modulating component of the modulating wave to the R/W 1 through the antenna 53 (change a terminal voltage of the antenna 27 of the R/W 1).

The PLL section 63 is set to generate a clock signal from data supplied from the ASK demodulating section 81 in synchronization with the data and output the clock signal to the BPSK demodulating circuit 62 and a BPSK modulating circuit 68.

When data demodulated by the ASK demodulating section 81 are BPSK-modulated, the BPSK demodulating circuit 62 is set to demodulate the data in accordance with the clock signal supplied from the PLL circuit 63 and output the demodulated data to the arithmetic section 64.

When the data supplied from the BPSK demodulating circuit 62 are enciphered, the arithmetic section 64 decodes the data by a cipher/decode section 92. Thereafter, the data are processed by a sequencer 91 as a command. When the data are not enciphered, the data supplied from the BPSK demodulating circuit 62 are directly supplied to the sequencer 91 without passing through the cipher/decode section 92.

The sequencer 91 is set to perform a processing corresponding to the supplied command. For example, at this time, the sequencer 91 processes data stored in an EEPROM 66 (a memory means).

A parity arithmetic section 93 of the arithmetic section 64 is set to calculate a Reed-Solomon code as parity from data to be stored in the EEPROM 66 and the data stored in the EEPROM 66.

Further, after a predetermined processing is performed in the sequencer 91, the arithmetic section 64 is set to output responsive data (data to be transmitted to the R/W 1) corresponding to that processing to the BPSK modulating circuit 68.

The BPSK modulating circuit 68 is set to BPSK-modulate the data supplied from the arithmetic section 64 (described later) and output the modulated data to an ASK modulating section 84 of the RF interface section 61.

When the sequencer 91 performs the processing, a RAM 67 is set to temporarily store data during the processing, etc.

The EEPROM (Electrically Erasable and Programmable ROM) 66 is a nonvolatile memory and is set to continuously store data even after communication of the IC card 2 with the R/W 1 is terminated and electric power supply is stopped.

Figure 4:
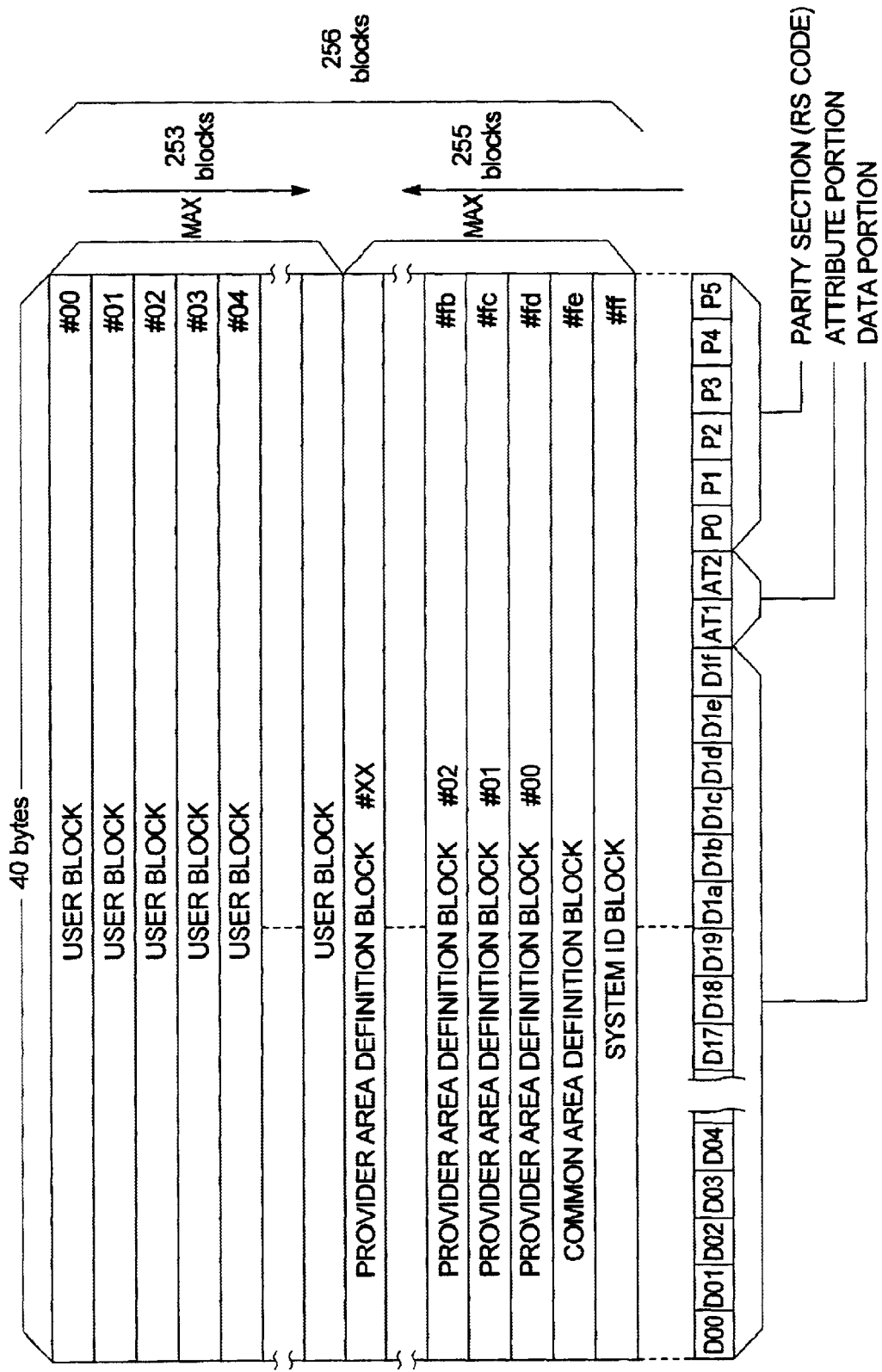
FIG. 4 is a view showing one example of the memory allocation of an EEPROM 66 shown in FIG. 3.

FIG. 4 shows one example of memory allocation of the EEPROM 66.

The EEPROM 66 has 256 physical blocks of 40 bytes. Each of the physical blocks is constructed by a total of 40 bytes of a data section of 32 bytes (D00 to D1f), an attribute section of 2 bytes (AT1, AT2), and a parity section of 6 bytes (P0 to P5).

A physical block number ffH (H represents a hexadecimal number) of the EEPROM 66 is allocated to a system ID block. The system ID block stores information with respect to the security of the IC card 2.

Next, the physical blocks are allocated to a common area definition block (first area) or a provider area definition block (first area) sequentially from a physical block number fdH to a physical block number 00H.

When the IC card 2 is issued, a person (provider) providing a system utilizing this IC card 2 is registered to the EEPROM 66 by a predetermined device (issuing device). The issuing device uses a provider area definition block sequentially from the physical block number fdH to the physical block number 00H in one physical block per one provider and registers the provider.

Information such as the position of a storing area used by the provider, etc. is stored in a common area definition block and the provider area definition block.

The physical blocks unused as the system ID block and the provider area definition block are allocated to a user block used by the provider.

Figure 5:
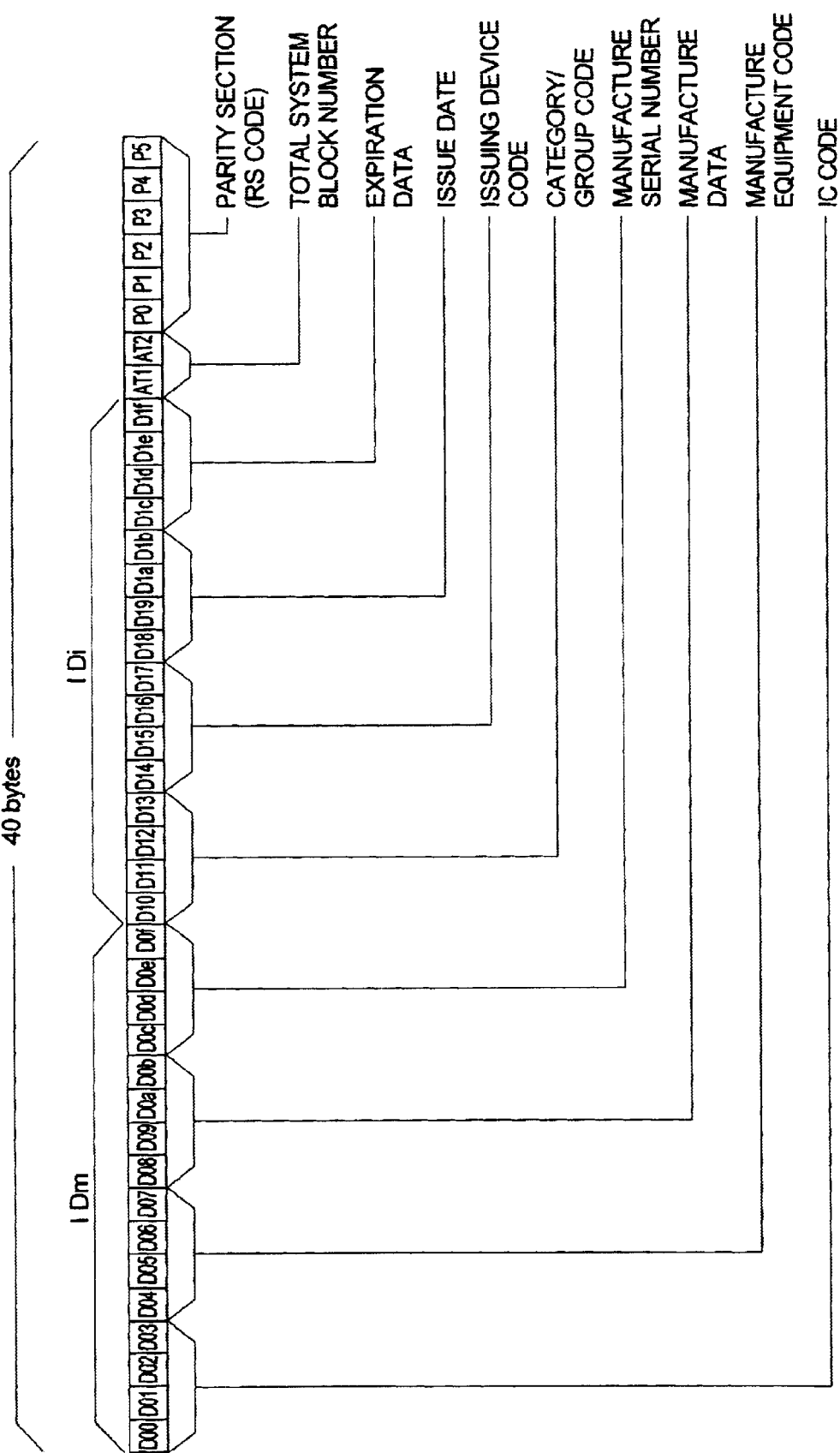
FIG. 5 is a view showing one allocating example of each of areas of a system ID block shown in FIG. 4.

FIG. 5 shows one example of the allocation of respective data with respect to the system ID block.

A manufacture ID (IDm) at a manufacturing time of the EEPROM 66 is stored in a data section from D00 to D0f. An IC code of the EEPROM 66, the code of a manufacture equipment manufacturing the EEPROM 66, a manufacture date of the EEPROM 66 and a manufacture serial number of the EEPROM 66 are respectively stored in an area from D00 to D03, an area from D04 to D07, an area from D08 to D0b and an area from D0c to D0f.

All the IC cards 2 (EEPROMS 66) can be discriminated from each other by utilizing information of the IDm. The manufacture date is set to the number of days from Jan. 1, 2000 with Jan. 1, 2000 as 0000H. When the manufacture date is a date in the 1990s, the manufacture date is represented as a negative day number from Jan. 1, 2000 by utilizing a complement of 2.

An issue ID (IDi) at an issuing time of the ID card 2 is stored in the data section from D10 to D1f. A category/group number showing a belonging category and a belonging group of the IC card 2, a code of the issuing device issuing this IC card 2, an issuing date of the IC card 2 and an effective expiration period of the IC card 2 are respectively stored in an area from D10 to D13, an area from D14 to D17, an area from D18 to D1b and an area from D1c to D1f.

Figure 6:
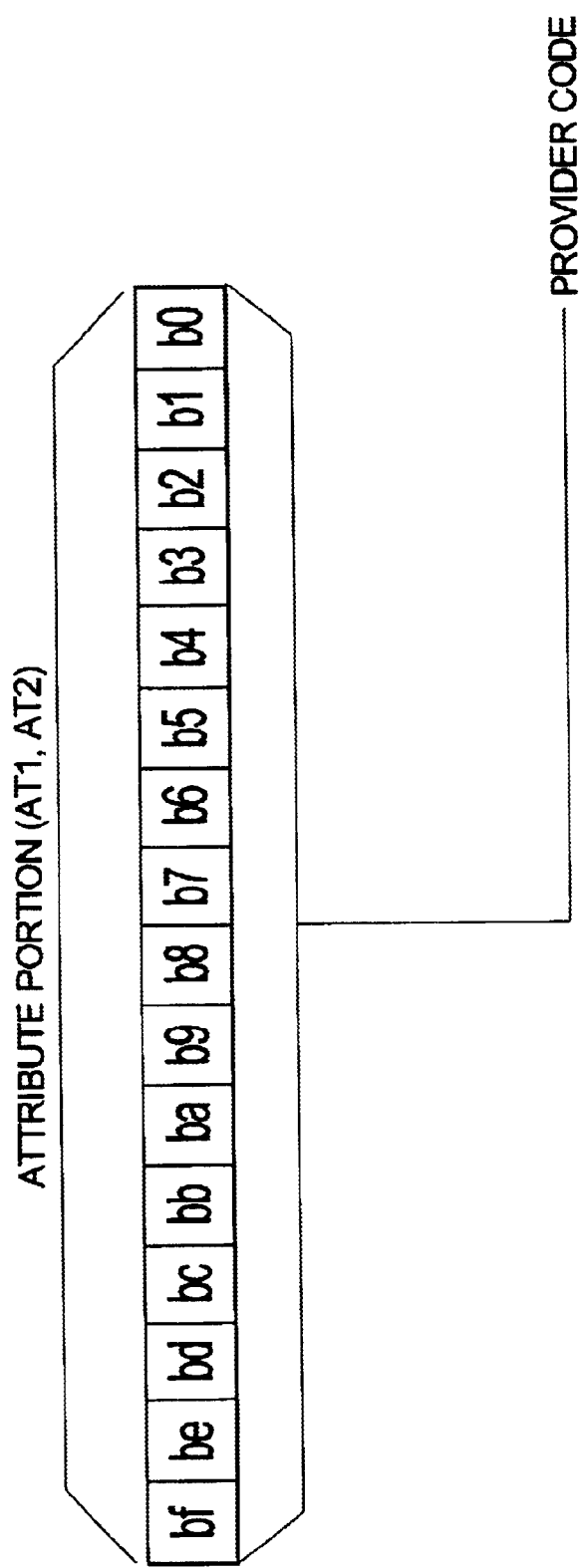
FIG. 6 is a view showing one example of an attribute section shown in FIG. 5.

FIG. 6 shows an attribute section of the system ID block. The attribute section stores the number of registered providers. The issuing device uses one physical block when one provider is registered. At this time, a value of this attribute section is updated.

The value of the attribute section is set to zero at its manufacturing time. Thereafter, when the issuing device registers providers to the IC card 2, the value of the attribute section is updated by the number of registered providers.

The parity section of the system ID block stores a Reed-Solomon code (RS code) calculated by the parity arithmetic section 93 from the values of respective bits of the data section and the attribute section. Accordingly, a value of the parity section is recalculated every time the value of the data section or the attribute section is updated.

Figure 7:
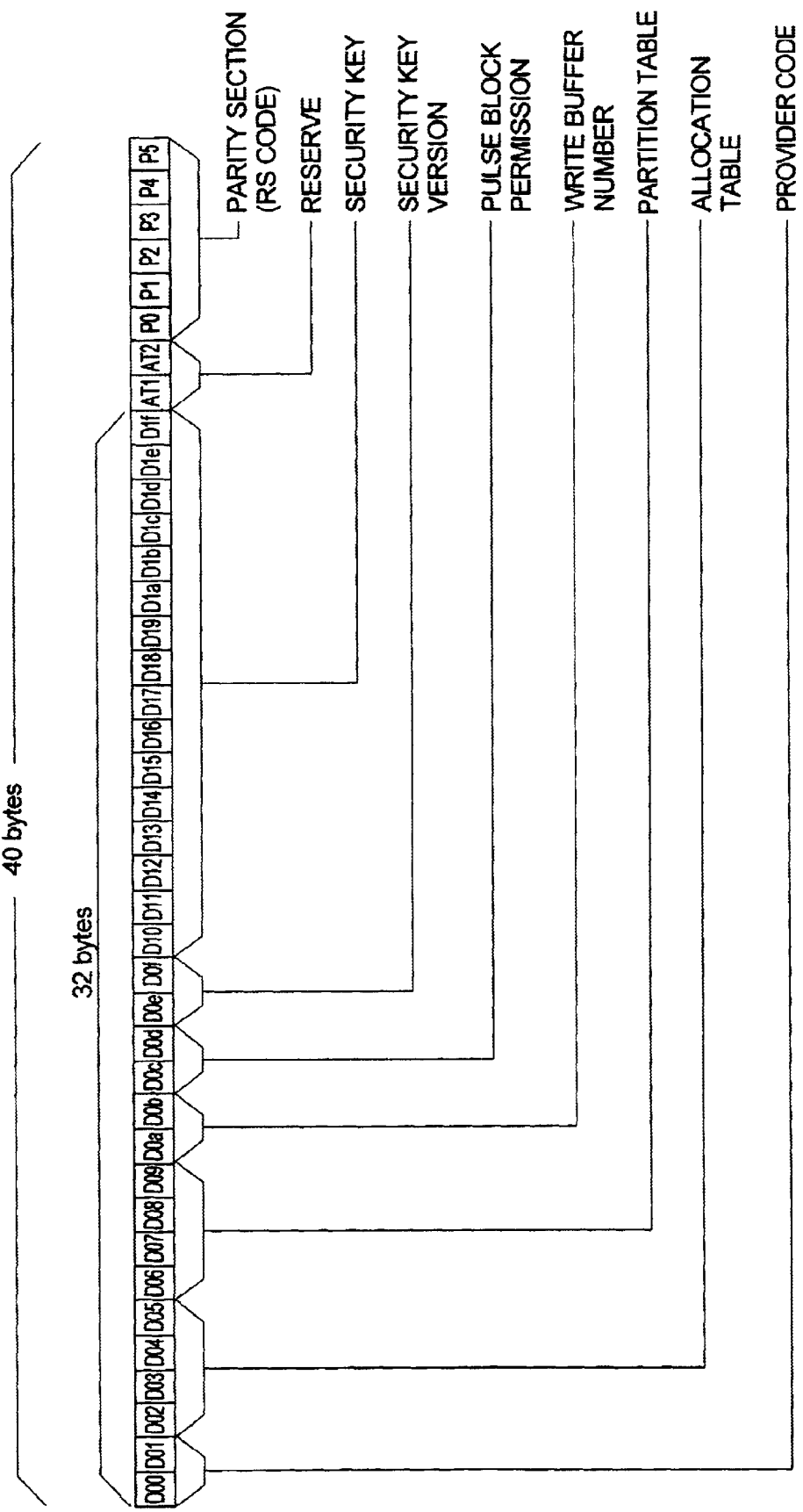
FIG. 7 is a view showing one allocating example of each of areas of an area definition block shown in FIG. 3.

FIG. 7 shows one example of each of the common area definition block and the provider area definition block. Data are written to these blocks by the issuing device in advance when the IC card 2 is issued.

The common area definition block is arranged at a physical block number feH of the EEPROM 66 and stores the setting of a memory area (common area) (second area) used by all the providers.

The provider area definition block is arranged from the physical block number fdH of the EEPROM 66 to the physical block number 00H, and stores information of the providers in one physical block per one provider.

As shown in FIG. 7, a provider code showing kinds of the providers is stored in areas D00, D01 of the data section D00 to D1f in the area definition blocks (the common area definition block and the provider area definition block). In the case of the common area definition block, values of the areas D00, D01 are set to 0000H. In the case of the provider area definition block, values of the areas D00, D01 are set to any value from 0001H to FFFFH.

Figure 8:
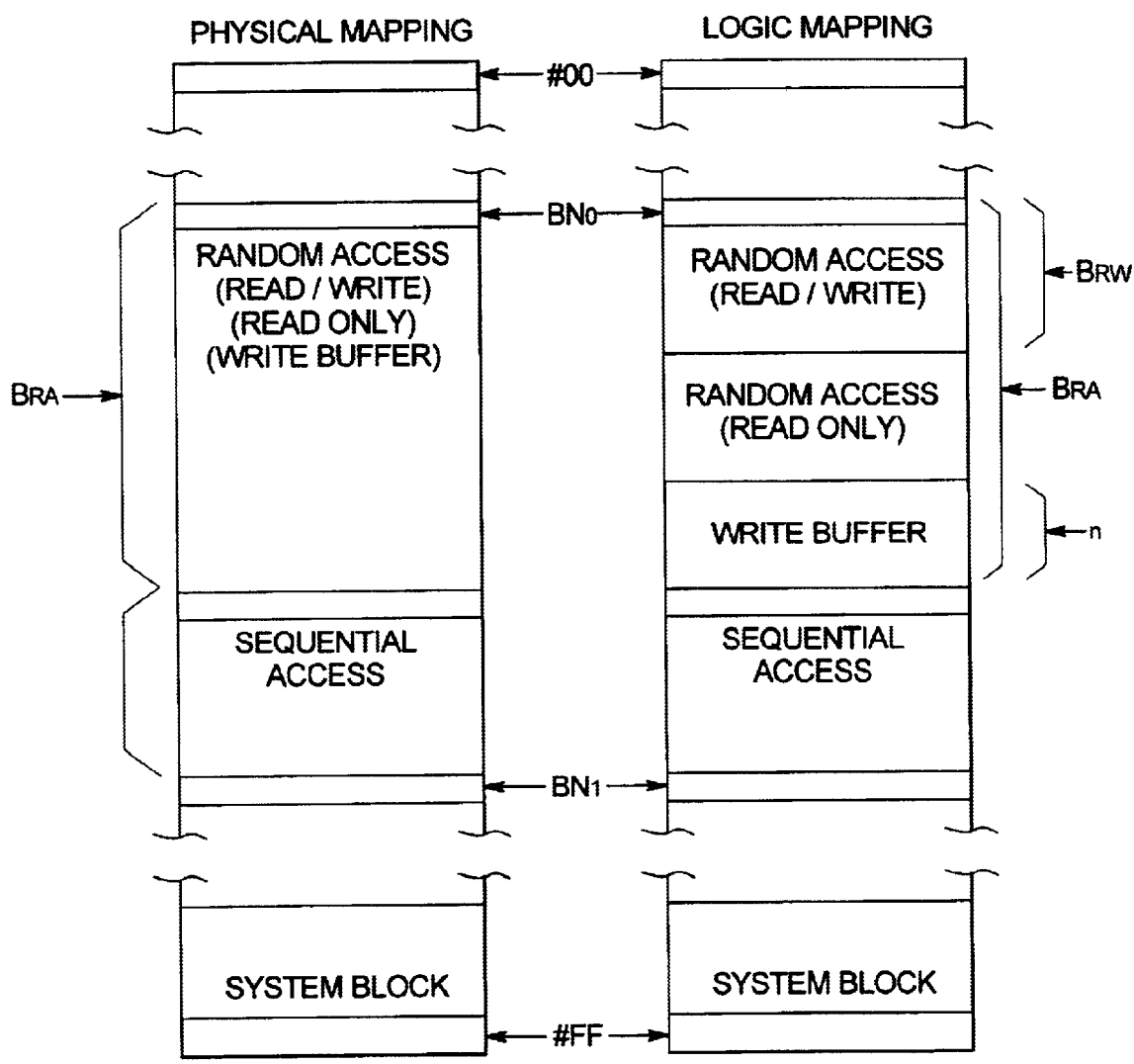
FIG. 8 is a view showing one allocating example of a user block shown in FIG. 3.

Areas D02 to D05 of the data section of each of the area definition block store an allocation table constructed by the number $BN_0$ (areas D02, D03) of a leading physical block in a memory area (provider area) (second area) used by the provider, and a number $BN_1$ (areas D04, D05) ($BN_1 > BN_0$) of the next physical block to the number of a final physical block. As shown in FIG. 8, the provider area is set at a predetermined position of the EEPROM 66 except for the system block (the system ID block and the area definition block).

Thus, since the provider area is designated by the $BN_0$ and $BN_1$, data can be managed by an amount of information proportional to the number of providers instead of the size of an area used by a provider (user) so that the utilization efficiency of the memory can be increased.

Areas D06 to D09 of the data section of the area definition block store a partition table constructed by a block number $B_{RA}$ (areas D06, D07) of a random access area (described later) and the block number $B_{RW}$ (areas D08, D09) of read/write blocks within the random access area among the memory area used by the provider. At this time, the block number $B_{RA}$ of the random access area is set to a value satisfying the following formula $$B_{RA}=0$$

or the following formula $$2 \times n \leq B_{RA} \leq B_{N1} - B_{N0}$$

(n is the number of write buffers (described later)). The block number $B_{RW}$ of read/write blocks is set to $B_{RW}=0$ in the case of $B_{RA}=0$. In contrast to this, this block number $B_{RW}$ is set to a value satisfying the following relation $$N \leq B_{RW} \leq B_{RA} - n$$

in the case of $B_{RA} \neq 0$.

A write buffer number n of the random access area is stored in areas D0a, D0b of the data section of the area definition block. The n-write buffers are utilized when n-data are simultaneously stored in logic block numbers 00H to (00+n(hexadecimal notation))H of the random access area. Only one write buffer is utilized when data are stored in a physical block having another logic block number in the random access area.

As mentioned above, an area (the provider area or the common area) from the physical block number $BN_0$ to the physical block number $(BN_1-1)$ is allocated to a provider designated by the provider code in accordance with the area definition block as shown in FIG. 8. Further, $B_{RA}$-physical blocks among that area (the provider area or the common area) are allocated to the random access area and the remaining physical blocks are allocated to a sequential access area (described later).

Further, the random access area is logically allocated to $B_{RW}$-read/write blocks, read only blocks, and n-write buffers in accordance with the area definition blocks as shown in FIG. 8. The physical blocks except for the read/write blocks and the write buffers are allocated to the read only blocks.

A purse block permission having the information of an access right to a purse block (described later) in the memory area (the random access area) utilized by the provider is stored in areas D0$c$, D0$d$ of the data section of the area definition blocks.

Figure 9:
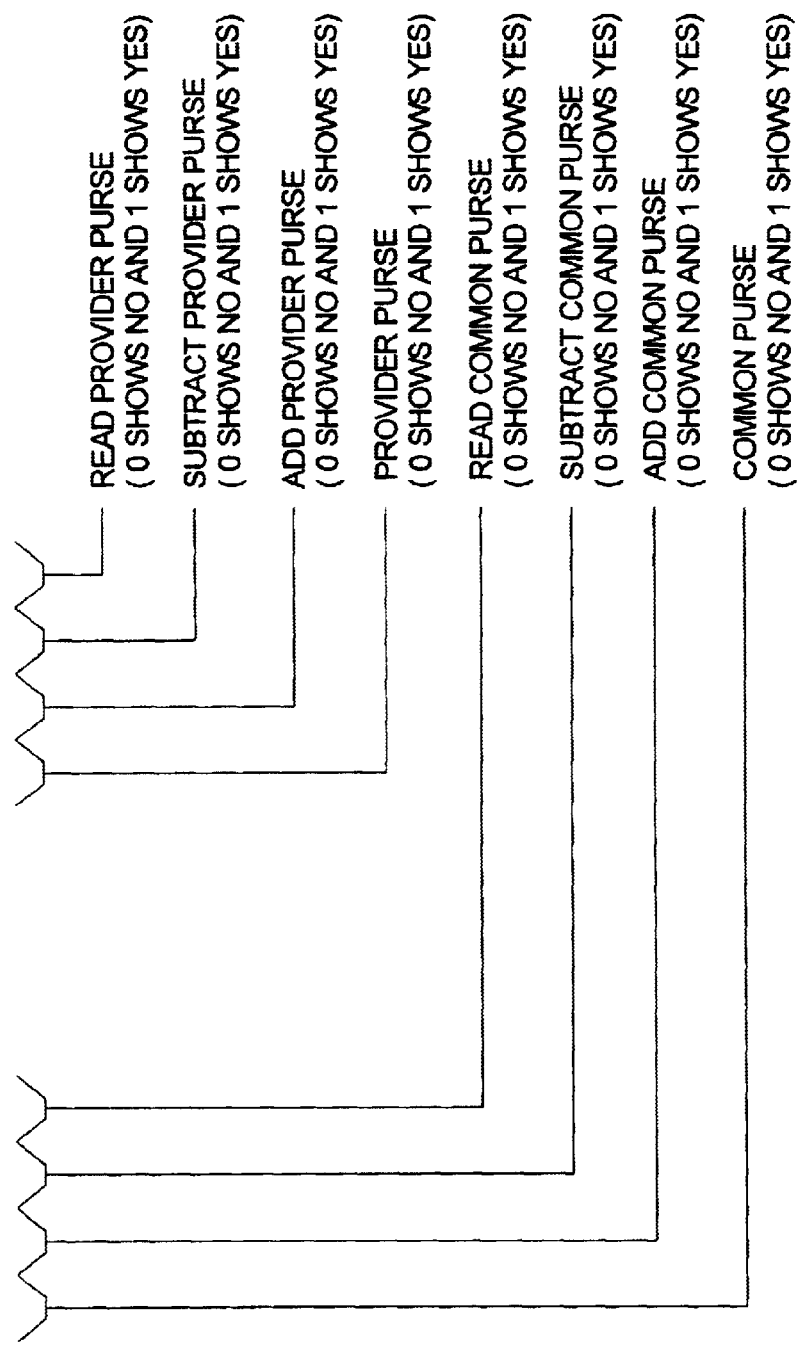
FIG. 9 is a view showing one example of a purse block permission shown in FIG. 7.

FIG. 9 shows one example of the purse block permission.

The purse block permission (16 bits, $b_0$ to $b_f$) shows permission or non-permission of reading, adding and subtracting instructions with respect to the purse block.

In the purse block permission of the common area definition block, it is stored in an area (bit) $b_b$ whether or not the purse block is used in a memory area (common area) set in the common area definition block. Namely, no purse block is used in the case of $b_b=0$. In contrast to this, the purse block is used in the case of $b_b=1$. The other areas (bits) in the purse block permission of the common area definition block are not particularly used. In the case of $b_b=1$, a read/write block having a logic block number of 00H is used as the purse block.

Next, in the purse block permission of the provider area definition block, it is stored in an area $b_3$ whether or not the purse block is used in a memory area set in the provider area definition block. Namely, no purse block is used in the case of $b_3=0$. In contrast to this, the purse block is used in the case of $b_3=1$. In the case of $b_3=1$, a read/write block having a logic block number of 00H is used as the purse block.

It is then stored in an area $b_2$ whether an adding instruction with respect to that purse block is given or not. It is also stored in an area $b_1$ whether a subtracting instruction with respect to that purse block is given or not. It is further stored in an area $b_0$ whether a reading operation with respect to that purse block is performed or not (This instruction is allowed in the case of $b_i=1$ (i=0, 1, 2), and is not allowed in the case of $b_i=0$). It is also stored in an area $b_b$ whether or not the purse block is used in the memory area set in the common area definition block. The same value as $b_b$ of the purse block permission of the common area definition block is stored in the area $b_b$.

It is further stored in an area $b_a$ whether the adding instruction with respect to that purse block is allowed or not. It is stored in an area $b_9$ whether the subtracting instruction with respect to that purse block is allowed or not. It is also stored in an area $b_8$ whether the reading operation with respect to that purse block is permitted or not (This instruction is allowed in the case of $b_i=1$ (i=8, 9, a) and is not allowed in the case of $b_i=0$.)

A version number of a security key (a common key and a provider key) utilized in authentication, encryption and decoding of a provider (R/W 1) is stored in areas D0$e$, D0$f$ of the data section of the area definition blocks. The security key is stored in areas D10 to D1$f$ of the data section.

When the R/W 1 performs polling, the IC card 2 sends back version numbers of these two keys (the common key and the provider key). Accordingly, the security keys of plural versions can be separately used in the authentication between the R/W 1 and the IC card 2.

The attribute sections AT1, AT2 of the area definition block are provided as a reserve and no information is particularly stored therein. Parity (an RS code) calculated from all bit values of the data section and the attribute sections is stored in the parity section of the area definition block.

Thus, the provider code, the allocation table, the partition table, the purse block permission, the security key version and the security key are stored in the area definition block set by the issuing device.

Figure 10:
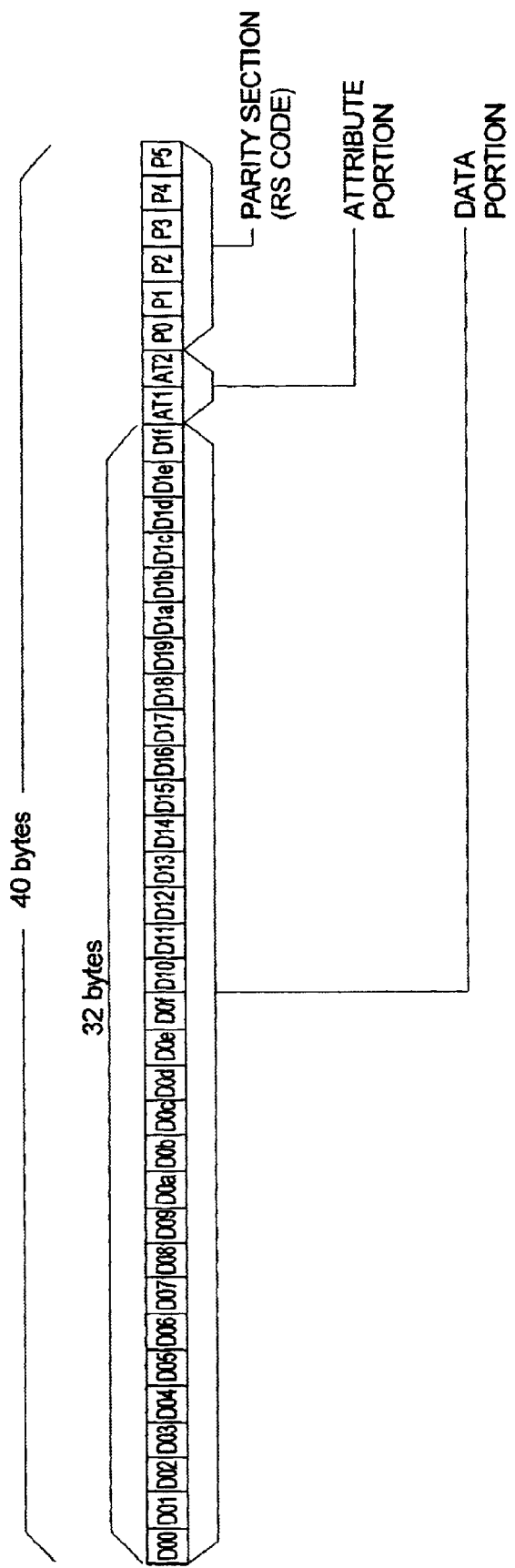
FIG. 10 is a view showing one allocating example of each of areas of the user block shown in FIG. 3.

FIG. 10 shows one example of the user block. A physical block except for the system ID block, the common area definition block and the provider area definition block in a memory space is used as the user block by a provider.

For example, as shown in FIG. 4, when the memory space is constructed by 256 blocks and eight providers are registered, 246 (=256–10) blocks except for a total of 10 (=1+1+8) system blocks of the system ID block, the common area definition block and eight provider area definition blocks are used as user blocks. When 40 providers are registered, the total number of system blocks is 42 (=1+1+40) so that 214 (=256–42) user blocks are secured.

The user blocks are allocated to the respective providers in accordance with the allocation table of the area definition block. The providers use the user blocks allocated in advance with reference to the allocation table. Accordingly, no providers get access to areas except for areas (the provider area or the common area) allocated in the allocation table.

The user blocks of the areas (the provider area or the common area) allocated in the allocation table are allocated to the random access area and the sequential access area in accordance with the above partition table.

Further, the user block of the random access area is utilized as any one of a read/write block, a read only block and a write buffer. As mentioned above, the number of these blocks is set in accordance with the partition table and the number of write buffers.

A data section from D00 to D1$f$ in the user blocks allocated in this way is used in accordance with processings performed by providers to which these user blocks are allocated.

Figure 11:
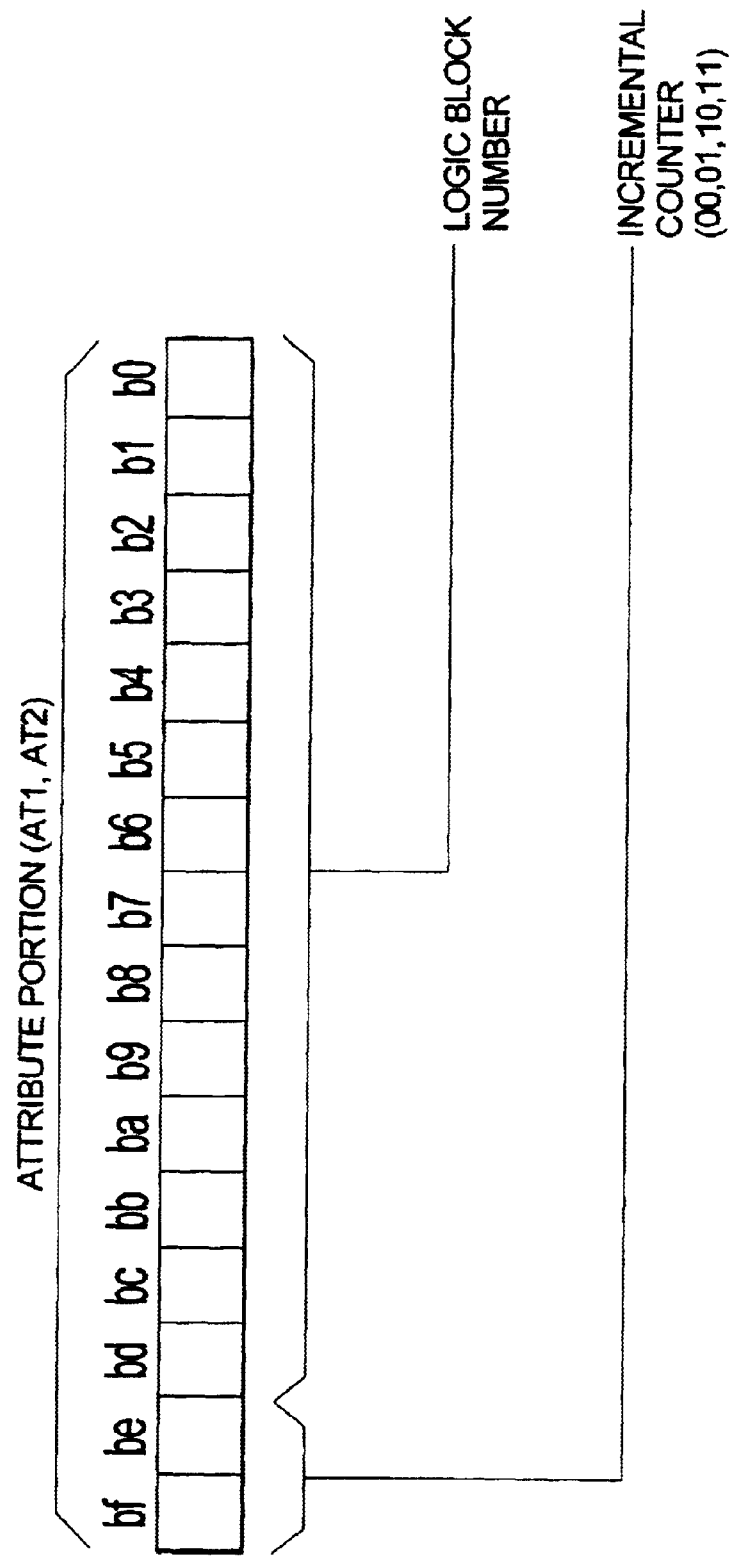
FIG. 11 is a view showing one example of the attribute section of the user block of a random access area shown in FIG. 8.

As shown in FIG. 11, an incremental counter (bits $b_f$, $b_e$) and a logic block number (bits from $b_d$ to $b_0$) are stored in the attribute section of a user block in the random access area.

The logic block number and the incremental counter are utilized when the user blocks of the random access area are accessed.

When data stored in the random access area are read, the read data (physical block) are retrieved by using the logic block number and newest data are read with reference to the incremental counter of data having that logic block number.

On the other hand, when data are to be stored in the random access area, a physical block (described later) set to be unnecessary is set to a write buffer with reference to the incremental counter and the logic block number of data already stored in the random access area. Thereafter, the data are written to that write buffer.

When the purse block permission of the above area definition block is set such that the purse block is to be used, a read/write block having a logic block number of 00H is used as the purse block.

The purse block is utilized when data are often added and subtracted and it is not desirable to read already stored values (since a possibility of information leakage is increased) and an access right to data is finely set, etc.

Figure 12:
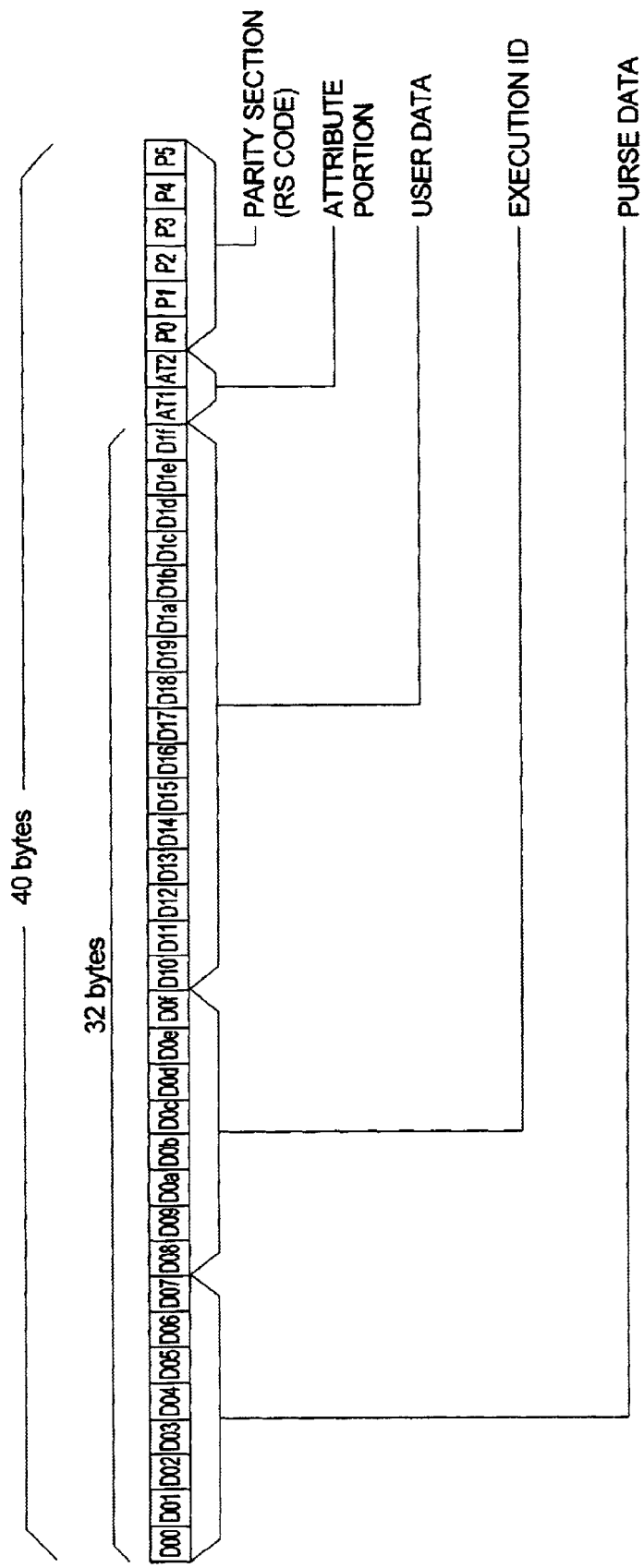
FIG. 12 is a view showing one allocating example of each of areas of the purse block.

FIG. 12 shows one example of the purse block. Areas D00 to D07 of a data section from D00 to D1$f$ in the purse block are utilized as a purse data section. An execution ID is stored in areas D08 to D0$f$ of the data section from D00 to D1$f$ in the purse block. Areas D10 to D1$f$ of the data section of the purse block are utilized as a user data section, but are set to perform only a reading operation.

Predetermined data are stored in the purse data section. The execution ID is referred when an adding or subtracting instruction with respect to the purse block is executed. This execution ID is compared with an execution ID included in that adding or subtracting instruction.

Figure 13:
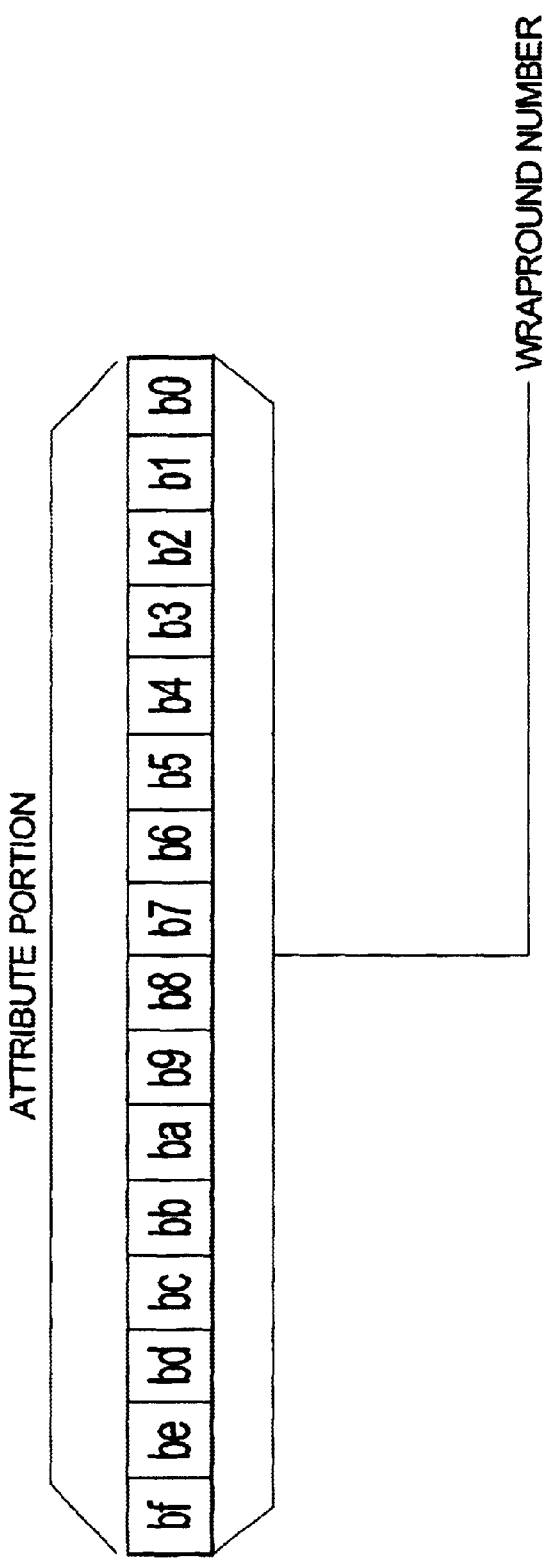
FIG. 13 is a view showing one example of the attribute section of the user block of a sequential access area shown in FIG. 8.

On the other hand, as shown in FIG. 13, a wraparound number (bits from $b_f$ to $b_0$) is stored in the attribute section of a user block of the sequential access area. Data are sequentially stored in the sequential access area from a leading physical block thereof. When data are stored up to the final physical block thereof, data are again sequentially stored from its leading physical block (the data are overwritten). This sequential order is stored as the wraparound number.

Accordingly, the wraparound number is utilized when the user block of the sequential access area is accessed. Further, the wraparound number is sequentially referred when data are stored in the sequential access area. The data are stored in a physical block next to a physical block having the final wraparound number. At this time, the wraparound number of the physical block storing the data thereto is set to a number provided by adding one to the final wraparound number.

For example, when an obstacle is caused during a writing operation at a previous writing time and a parity error (physical memory corruption) is caused in a physical block having the final wraparound number, new data are stored to this physical block. When the physical block having the final wraparound number is a final physical block of the sequential access area, the new data are stored in a leading physical block of the sequential access area.

As mentioned above, the EEPROM 66 is suitably utilized by each provider.

Figure 14:
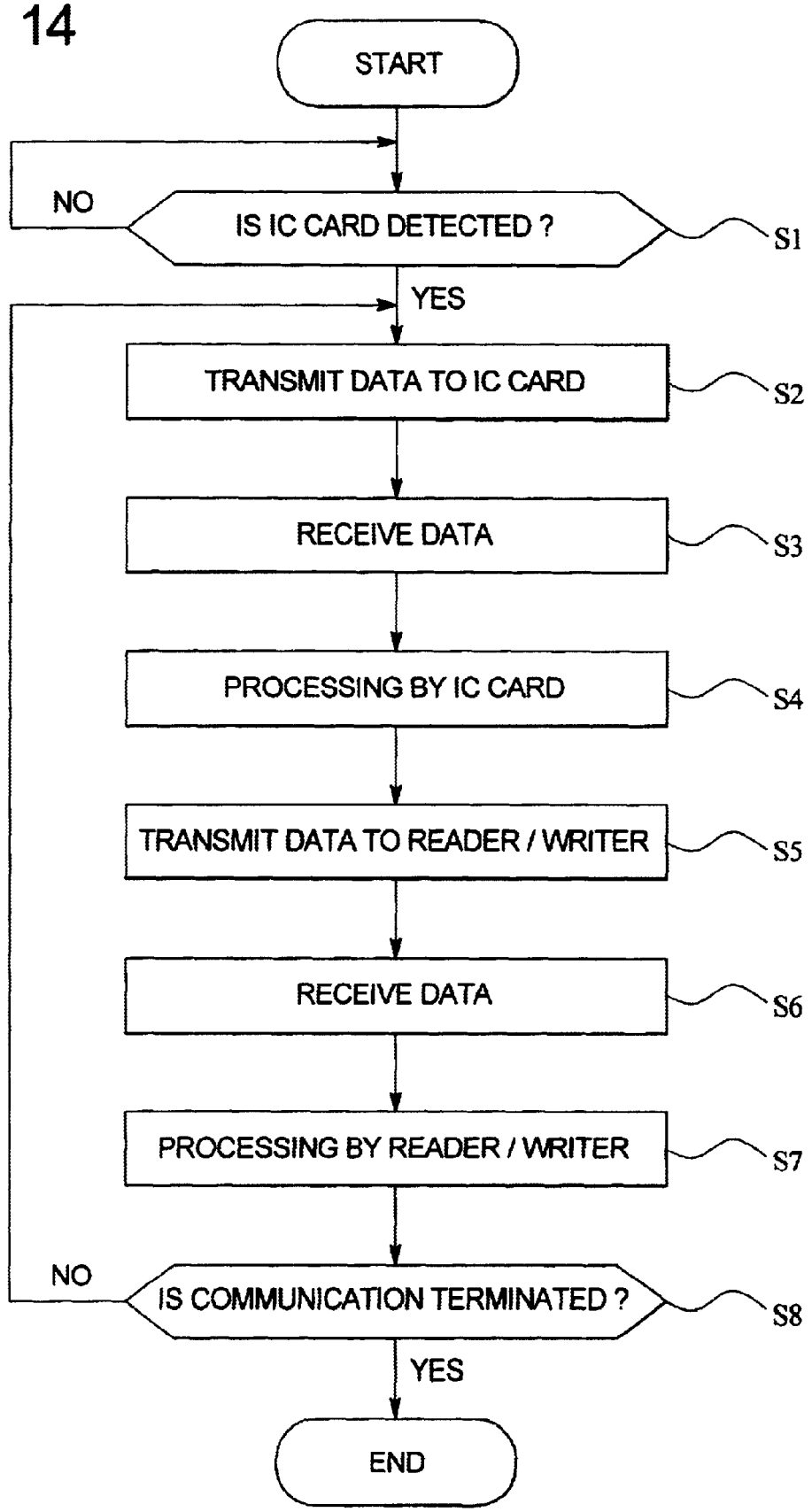
FIG. 14 is a flow chart for explaining an operation of the noncontact card system shown in FIG. 1.
Figure 15:
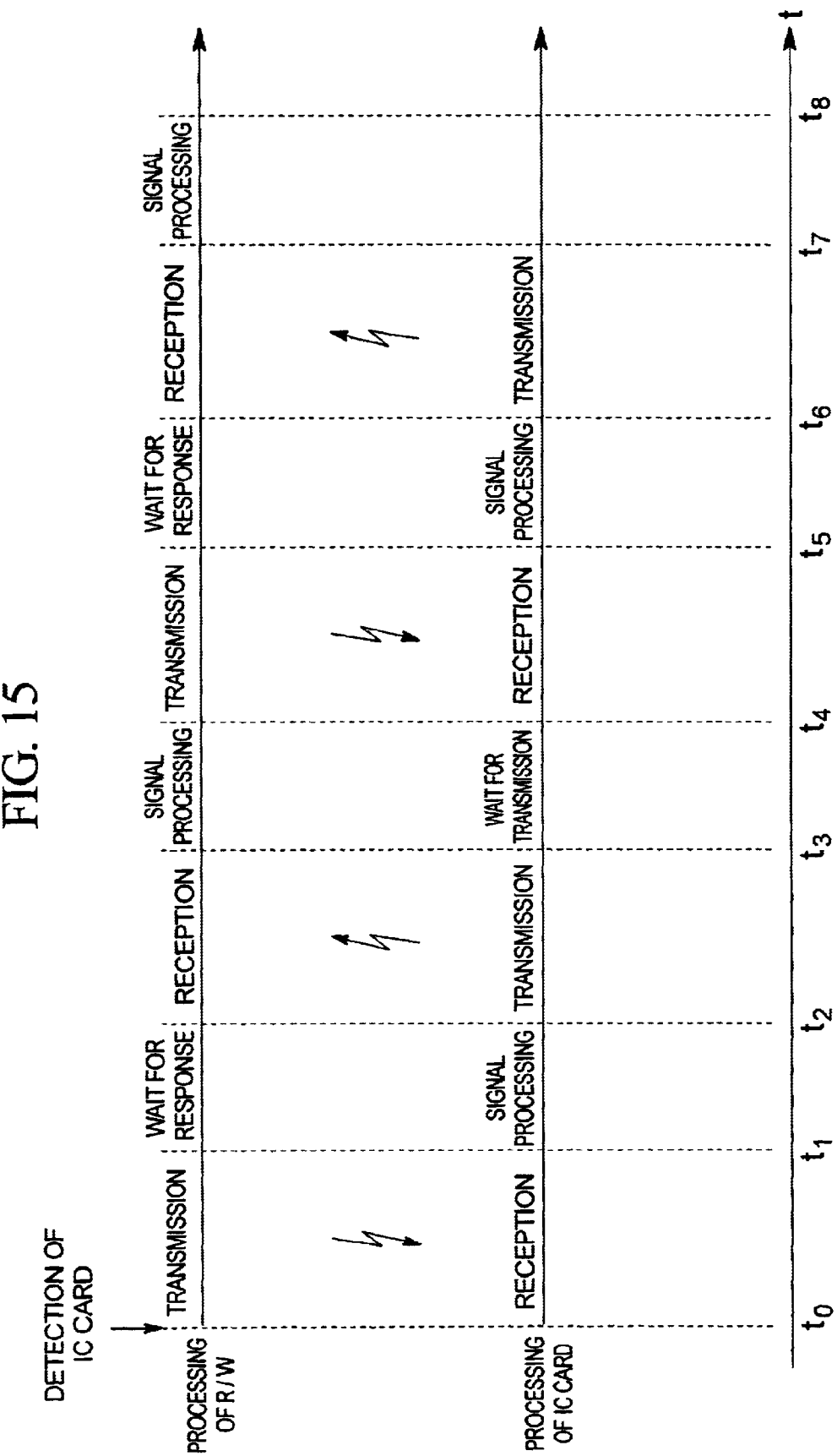
FIG. 15 is a timing chart used for explaining the operation of the noncontact card system shown in FIG. 1.

Operations of the IC card 2 and the R/W 1 will next be explained with reference to the flow chart of FIG. 14 and the timing chart of FIG. 15.

First, in a step S1, the R/W 1 corresponding to a provider registered at the IC card 2 radiates a predetermined electromagnetic wave from the antenna 27 and monitors a load state of the antenna 27 and is on standby until the IC card 2 approaches the same and a change in the load state is detected. In the step S1, the R/W 1 may radiate an electromagnetic wave ASK-modulated by the data of a predetermined short pattern and the IC card 2 may be repeatedly called until a response from the IC card 2 is obtained at a constant time.

When the R/W 1 detects in the step S1 that the IC card 2 approaches the same (at a time to in FIG. 15), it proceeds to a step S2 and the SPU 32 of the R/W 1 performs a BPSK modulating operation by data (a command corresponding to processing executed by the IC card 2) (e.g., data shown in FIG. 16($b$)) to be transmitted to the IC card 2 with a rectangular wave of a predetermined frequency (e.g., a frequency twice a clock frequency of data) as shown in FIG. 16($a$) as a carrier wave. The SPU then outputs the generated modulating wave (a BPSK modulating signal) (FIG. 16($c$)) to the modulating circuit 23.

When data showing a value 0 appear as shown in FIG. 16($c$) by utilizing differential conversion at a time of the BPSK modulation, the same BPSK modulating signal as a just prior BPSK modulating signal ("1" "0" or "0" "1") is set to a BPSK modulating signal. In contrast to this, when data showing a value 1 appear, a BPSK modulating signal ("1" is inverted to "0" and "0" is inverted to "1") having an inverted phase of the just prior BPSK modulating signal is set to a BPSK modulating signal.

Thus, data are held by a change in phase of the modulating wave by utilizing the differential conversion so that the data are demodulated to original data even when the BPSK modulating signal is inverted. Accordingly, when the data are demodulated, it is not necessary to consider polarities of the modulating wave.

Then, the modulating circuit 23 ASK-modulates the predetermined carrier wave by its BPSK modulating signal in a modulation degree (=a maximum amplitude of a data signal/a maximum amplitude of the carrier wave) smaller than one (e.g., 0.1). The modulating circuit transmits the generated modulating wave (ASK modulating wave) to the IC card 2 through the antenna 27 (for a time period from $t_0$ to $t_1$ in FIG. 15).

When no modulating wave is transmitted, the modulating circuit 23 is set to generate the modulating wave at a high level among two levels (high and low levels) of a digital signal.

Next, in a step S3, the IC card 2 converts a part of the electromagnetic wave radiated from the antenna 27 of the R/W 1 to an electric signal by the antenna 53 and the capacitor 52, and outputs this electric signal (modulating wave) to the RF interface 61 of an IC 51. Then, the ASK demodulating section 81 of the RF interface section 61 rectifies and smoothes that modulating wave (namely, detects an envelope) and supplies a generated signal to the voltage regulator 82. Further, the ASK demodulating section extracts a data signal by restraining a direct current component of the generated signal, and outputs that data signal to the BPSK demodulating circuit 62 and the PLL section 63.

The voltage regulator 82 stabilizes the signal supplied from the ASK demodulating section 81 and generates a direct current power and supplies the direct current power to each of the circuits.

At this time, for example, a terminal voltage $V_0$ of the antenna 53 is given as follows.

$$V_0 = V_{10}(1 + k \times V_S(t))\cos(\omega t)$$

Here, $V_{10}$ shows the amplitude of a carrier wave component.

Further, for example, a voltage value $V_{LR}$ at a low level with respect to a voltage $V_1$ after being rectified by the ASK demodulating section 81 is given as follows.

$$V_{LR} = V_{10}(1 + k \times (-1)) - Vf$$

Here, Vf shows a voltage drop across a diode D of the rectifying circuit. Vf is normally about 0.7 volt.

The voltage regulator 82 stabilizes the signal rectified and smoothed by the ASK demodulating section 81 and supplies the signal to each circuit such as an arithmetic section 64 as the direct current power. Since the modulation degree k of the modulating wave is smaller than one, a voltage fluctuation after being rectified (the difference between a high level and a low level) is small. Accordingly, the voltage regulator 82 can easily generate the direct current power.

For example, when the modulating wave of 5% in modulation degree k is received such that $V_{10}$ is equal to or greater than 3 volts, the low level voltage $V_{LR}$ after being rectified is equal to or greater than 2.15 ($=3\times(1-0.05)-0.7$) volts so that the voltage regulator 82 can supply a sufficient voltage to each circuit as electric power. Further, the amplitude $2\times k\times V_{10}$ (a peak-to-peak value) of an alternate current component (a data component) of the voltage $V_1$ after being rectified is equal to or greater than 0.3 ($=2\times0.05\times3$) volts so that the ASK demodulating section 81 can demodulate data at a sufficiently high S/N ratio.

Thus, communication is performed at a low error rate (in a high S/N ratio) by utilizing the ASK modulating wave having the modulation degree k smaller than one, and a sufficient direct current voltage is supplied to the IC card 2 as electric power.

The BPSK demodulating circuit 62 demodulates the data signal (the BPSK modulating signal) from the ASK demodulating section 81 in accordance with the clock signal supplied from the PLL section 63, and outputs demodulated data to the arithmetic section 64.

Next, in a step S4, when data supplied from the BPSK demodulating circuit 62 are enciphered, these data are decoded by the cipher/decode section 92 in the arithmetic section 64. Thereafter, these data (command) are supplied to the sequencer 91 which performs the processing corresponding to this command (in a period from $t_1$ to $t_2$ in FIG. 15). In this period, i.e., in a period until a response from the IC card 2 is received, the R/W 1 is on standby in a state in which the data of a value 1 are being transmitted. Accordingly, in this period, the IC card 2 receives a modulating wave having a constant maximum amplitude.

Next, in a step S5, the sequencer 91 of the arithmetic section 64 outputs data of processed results, etc. (data to be transmitted to the R/W 1) to the BPSK modulating circuit 68. Similar to the SPU 32 of the R/W 1, the BPSK modulating circuit 68 BPSK-modulates the data and then outputs the modulated data to the ASK modulating section 84 of the RF interface section 61.

The ASK modulating section 84 ASK-modulates the received modulating wave (the maximum amplitude of the modulating wave is constant in a transmitting time of the IC card 2) in accordance with data to be transmitted by changing a load connected to both ends of the antenna 53 in accordance with data by utilizing a switching element. A terminal voltage of the antenna 27 of the R/W 1 is fluctuated in accordance with the modulation and the data are transmitted to the R/W 1 (in a period from $t_2$ to $t_3$ in FIG. 15).

In a step S6, the modulating circuit 23 of the R/W 1 continuously transmits the data of a value 1 (high level) even when data from the IC card 2 are received. The demodulating circuit 25 detects the data transmitted by the IC card 2 from a fine fluctuation (e.g., several ten microvolts) in the terminal voltage of the antenna 27 electromagnetically coupled to the antenna 27 of the IC card 2.

The demodulating circuit 25 amplifies a detected signal (the ASK modulating wave) by an amplifier with high gain. Thereafter, the demodulating circuit demodulates the detected signal and outputs generated digital data to the SPU 32.

In a step S7, the SPU 32 of the R/W 1 demodulates the data (the BPSK modulating signal) and then outputs the data to the DPU 31. The DPU 31 processes the data (in a period from $t_3$ to $t_4$ in FIG. 15).

Further, in a step S8, the DPU 31 of the R/W 1 judges whether or not communication is terminated in accordance with processed results. When the DPU judges that the communication is again performed, it is returned to the step S2 and the next data (command) communication is performed in steps S2 to S7 (in a period from $t_4$ to $t_8$ in FIG. 15). In contrast to this, when the DPU judges that the communication is terminated, the R/W 1 terminates the communication with the IC card 2.

As mentioned above, the R/W 1 transmits a predetermined command to the IC card 2 by utilizing the ASK modulation having a modulation degree k smaller than one. The IC card 2 receives that command and performs the processing corresponding to the command and sends data corresponding to results of the processing back to the R/W 1.

Next, in the processing performed by the IC card 2 in the above step S4, an operation at a data writing time to the EEPROM 66 will next be explained with reference to the flow charts of FIGS. 17 to 21.

Figure 17:
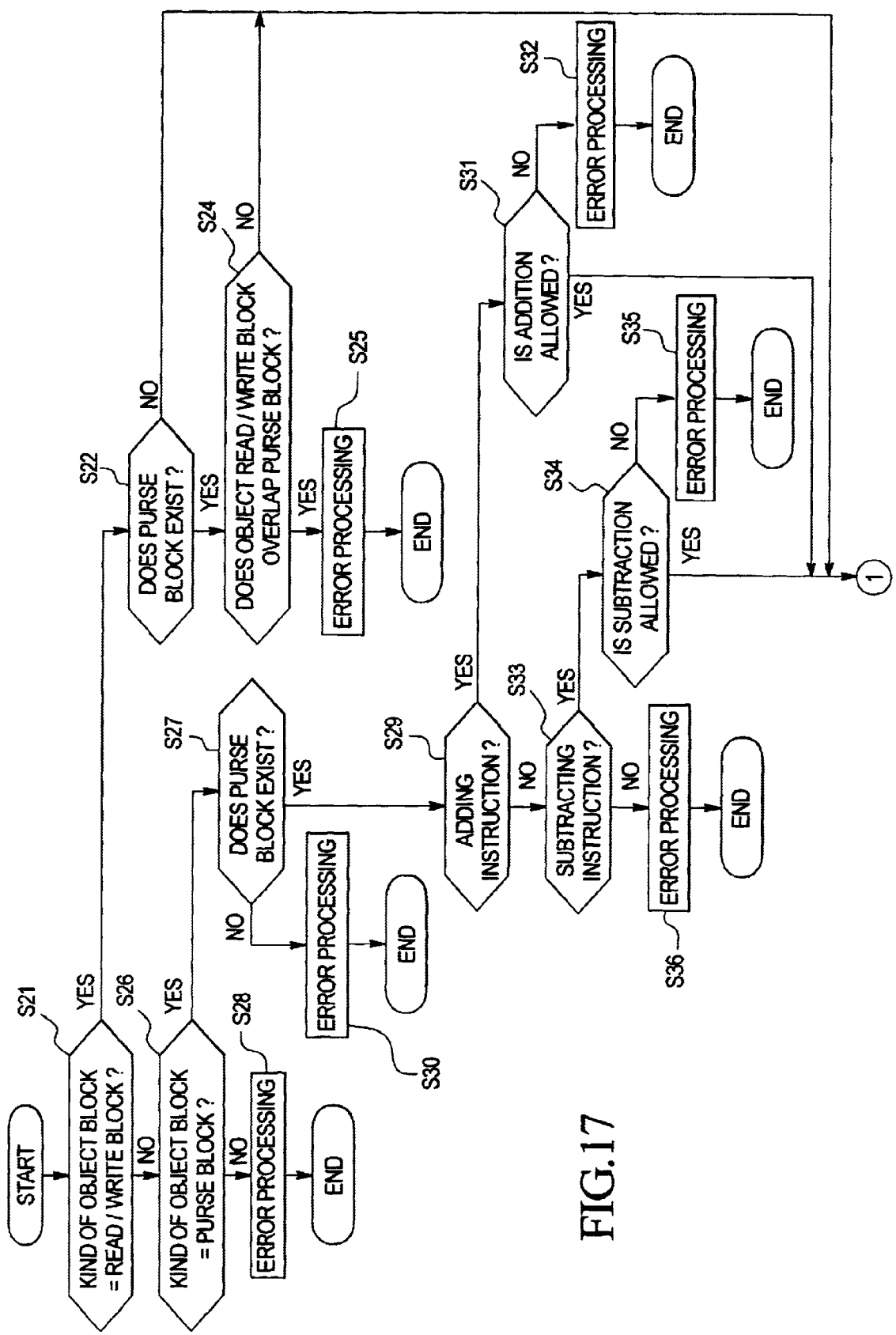
FIG. 17 is a flow chart used for explaining an operation of the IC card 2 at a writing time to the user block of the random access area shown in FIG. 8.

First, an operation at a data writing time to the random access area of the EEPROM 66 will be explained with reference to the flow charts of FIGS. 17 to 19.

In a step S21, the sequencer 91 judges whether a physical block for writing data therein is a read/write block (in which no purse block is included) or not. When the sequencer judges that this physical block is a read/write block, it proceeds to a step S22.

The sequencer 91 then refers to a purse block permission of the provider area definition block having a provider code of the R/W 1, and judges whether a purse block is used or not. When no purse block is used, it proceeds to a step S23 (FIG. 18).

In contrast to this, when the sequencer 91 judges in the step S22 that the purse block is used, the sequencer judges in a step S24 whether the logic block number of data to be stored (written) is 00H or not. Namely, the sequencer judges whether the read/write block for writing data therein is overlapped with the purse block or not. When the sequencer 91 judges that the read/write block for writing data therein is not overlapped with the purse block, it proceeds to the step S23.

In contrast to this, when the sequencer 91 judges that the read/write block for writing data therein is overlapped with the purse block, the sequencer performs an error processing in a step S25 and the processing of the sequencer is then terminated.

When the sequencer judges in the step S21 that the physical block for writing data therein is not a read/write block, it proceeds to a step S26. The sequencer 91 then judges whether the physical block for writing data therein is a purse block or not. When the sequencer judges that this physical block is a purse block, it proceeds to a step S27.

In contrast to this, when the sequencer 91 judges that the physical block for writing data therein is not a purse block, the sequencer performs an error processing in a step S28 and processing of this sequencer is then terminated.

In the step S27, the sequencer 91 searches the purse block (the physical block having a logic block number of 00H) in the random access area. When the sequencer finds the purse block, it proceeds to a step S29.

In contrast to this, when no purse block is found in the step S27, no data can be written to the purse block. Accordingly, the sequencer 91 performs the error processing in a step S30 and the processing of this sequencer is then terminated.

Next, in the step S29, the sequencer 91 judges whether an instruction (command) with respect to this purse block is an adding instruction or not. When the sequencer judges that this instruction is an adding instruction, it proceeds to a step S31. In this step S31, the sequencer refers to the purse block permission of the provider area definition block and judges whether the adding instruction is allowed or not.

When the sequencer 91 judges in the step S31 that the adding instruction with respect to the purse block is allowed, it proceeds to the step S23.

In contrast to this, when the sequencer 91 judges in the step S31 that the adding instruction with respect to the purse block is not allowed, the sequencer performs the error processing without executing the adding instruction in the step S32 and the processing of this sequencer is then terminated.

When the sequencer 91 judges in the step S29 that the instruction with respect to the purse block is not the adding instruction, it proceeds to a step S33. In this step S33, the sequencer judges whether the instruction with respect to that purse block is a subtracting instruction or not. When the sequencer judges that this instruction is a subtracting instruction, it proceeds to a step S34.

In the step S34, the sequencer 91 refers to the purse block permission of the provider area definition block and judges whether the subtracting instruction is allowed or not. When the sequencer judges that the subtracting instruction with respect to the purse block is allowed, it proceeds to the step S23.

On the other hand, when the sequencer 91 judges in the step S34 that the subtracting instruction with respect to the purse block is not allowed, the sequencer performs the error processing without executing the subtracting instruction in a step S35 and the processing of this sequencer is then terminated.

Also, when the sequencer 91 judges in the step S33 that the instruction with respect to the purse block is not a subtracting instruction, the sequencer performs the error processing in a step S36 and the processing of the sequencer is then terminated.

Figure 18:
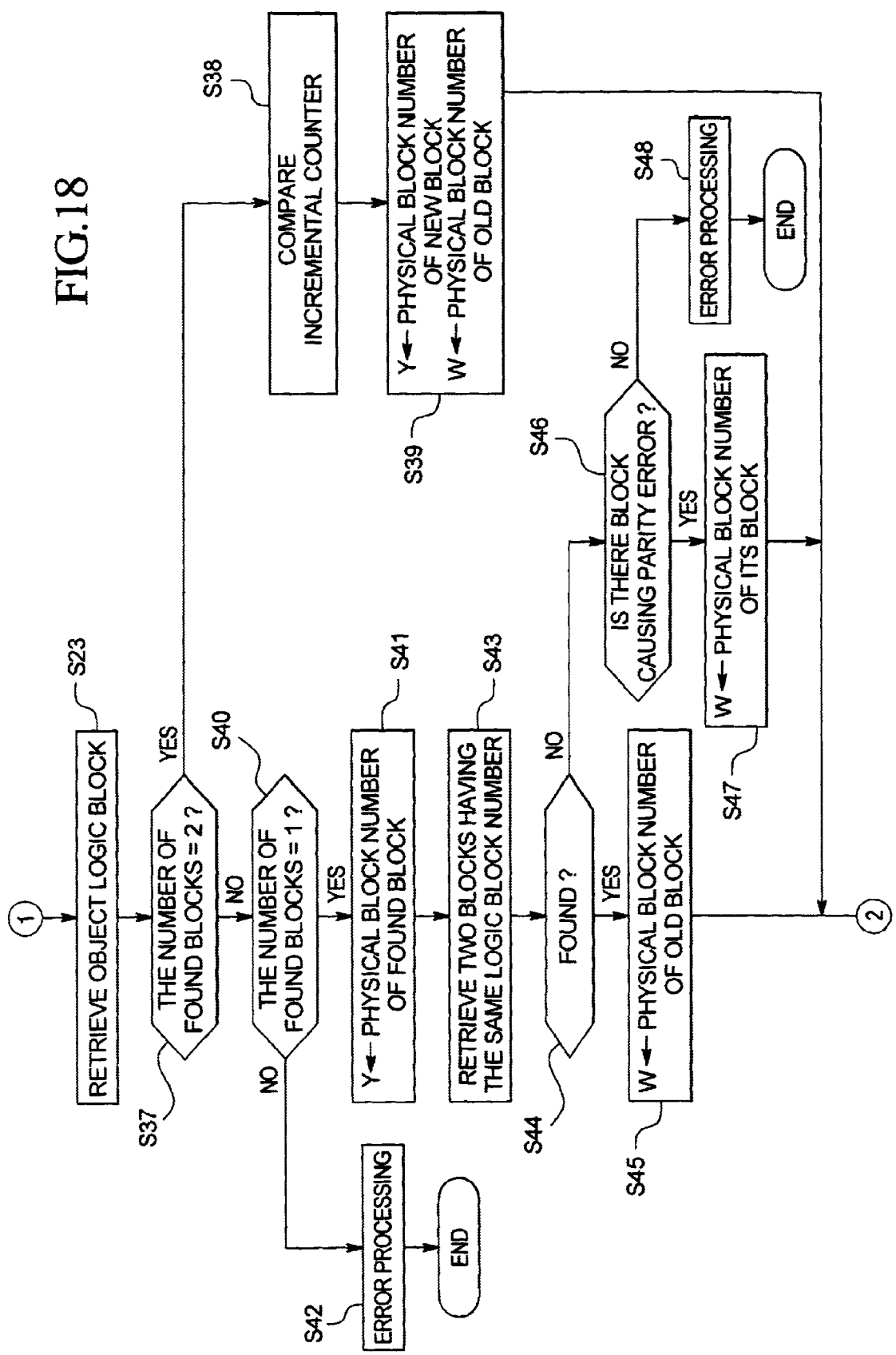
FIG. 18 is a flow chart used for explaining the operation of the IC card 2 at the writing time to the user block of random access area shown in FIG. 8.

Next, in the step S23 of FIG. 18, the sequencer 91 retrieves physical blocks of the random access area and searches a physical block having the same logic block number as the logic block number of data to be written.

In a step S37, the sequencer 91 judges whether the number of physical blocks found in the step S23 is two or not. When this number is two, it proceeds to a step S38. In this step S38, the sequencer reads the values (any one of 00, 01, 10 and 11) of incremental counters in these two physical blocks and compares the values with each other.

A physical block having a large incremental counter value is set to a physical block (a new physical block) in which new data are stored. A physical block having a small incremental counter value is set to a physical block (an old physical block) in which old data are stored.

However, when the two incremental counter values are 00 and 11, a physical block having the incremental counter value 00 is set to a new physical block while a physical block having the incremental counter value 11 is set to an old physical block.

In a step S39, the sequencer 91 stores a number of the new physical block (physical block number) among the two physical blocks in the RAM 67 as a variable Y, and stores a number of the old physical block in the RAM 67 as a variable W (the number of a physical block utilized as a write block).

Thus, after the variables Y and W are stored by the sequencer 91, it proceeds to a step S49.

When the sequencer 91 judges in the step S37 that the number of physical blocks found in the step S23 is not two, it proceeds to a step S40. In this step S40, the sequencer 91 judges whether the number of physical blocks found in the step S23 is one or not. When the sequencer judges that this number is one, it proceeds to a step S41.

When the sequencer 91 judges in the step S40 that the number of physical blocks found in the step S23 is not one, the sequencer performs the error processing in the step S42 and processing of this sequencer is then terminated.

Next, in the step S41, the sequencer 91 stores a number of the found physical block (one physical block) in the RAM 67 as a variable Y and it then proceeds to a step S43.

In the step S43, the sequencer 91 retrieves physical blocks of the random access area and searches two physical blocks having the same predetermined logic block number.

When the physical blocks are retrieved, the retrieving operation is sequentially performed from a logic block number 00H. Accordingly, a retrieving time can be shortened when the logic block number of data to be often written is set to a smaller number.

In a step S44, the sequencer 91 judges whether the two physical blocks having the same logic block number are found in the step S43 or not. When the sequencer judges that these two physical blocks are found, it proceeds to a step S45. In this step S45, the sequencer refers to incremental counters of the two found physical blocks and stores the number of an older physical block among the two physical blocks in the RAM 67 as a variable W and it then proceeds to a step S49 (FIG. 19).

In contrast to this, when the sequencer judges in the step S44 that no two physical blocks are found in the step S43, it proceeds to a step S46. In this step S46, the sequencer 91 successively calculates parity of each of the physical blocks in the random access area and compares the same with a value stored to a parity section of each of the physical blocks. The sequencer thus searches a physical block causing a parity error.

The sequencer then judges whether there is a physical block causing the parity error or not. When the sequencer judges that there is a physical block causing the parity error, it proceeds to a step S47. In this step S47, the sequencer 91 stores a number of that physical block in the RAM 67 as a variable W and it then proceeds to a step S49.

In contrast to this, when the sequencer judges in the step S46 that there is no physical block causing the parity error, the sequencer performs the error processing in the step S48 and the processing of the sequencer is then terminated.

Figure 19:
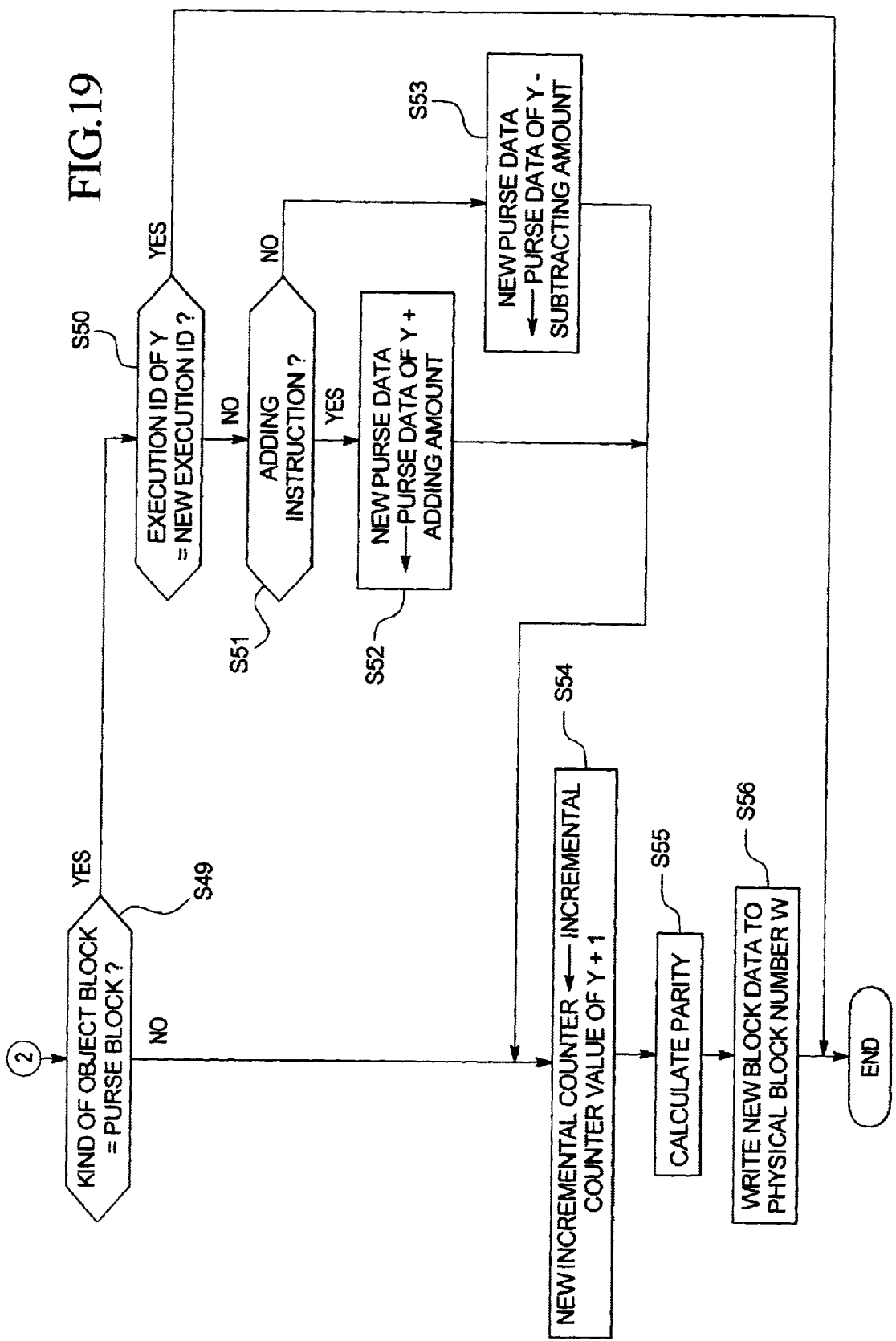
FIG. 19 is a flow chart used for explaining the operation of the IC card 2 at the writing time to the user block of random access area shown in FIG. 8.

Next, in the step S49 of FIG. 19, the sequencer 91 judges whether a physical block for writing data therein is a purse block (a physical block having a logic block number of 00H) or not. When the sequencer judges that the physical block is a purse block, it proceeds to a step S50. In this step, the sequencer judges whether or not the execution ID of an instruction given to the purse block is the same as the execution ID of the physical block of a number stored as the variable Y in the step S39 or S41. When the sequencer judges that this execution of the instruction given to the purse block is the same as the execution of the physical block of this number, the sequencer judges that this instruction is already processed and the processing of the sequencer is terminated.

Thus, when the R/W 1 retries the same command by utilizing the execution ID and this command is already processed, the IC card 2 does not perform processing of this command so that the same command is not processed twice.

When the sequencer judges in the step S50 that the execution ID of the instruction given to the purse block is not the same as the execution ID of the physical block of a number stored as the variable Y, the sequencer judges in a step S51 whether the instruction given to the purse block is an adding instruction or not. When this instruction is an adding instruction, it proceeds to a step S52. At this time, the execution ID of the physical block of the number of the variable Y is set to an execution ID of new block data.

In the step S52, the sequencer 91 reads the purse data of the physical block of the number of the variable Y, and calculates a sum of the purse data and data included in the instruction given to the purse block. The sequencer then sets this sum to purse data (new purse data) in new block data. After such processing is performed, it proceeds to a step S54. At this time, the execution ID of the physical block of the number of the variable Y is set to an execution ID of the new block data.

When the sequencer 91 judges in the step S51 that the instruction given to the purse block is not an adding instruction (i.e., is a subtracting instruction), it proceeds to a step S53. In this step S53, the sequencer reads the purse data of the physical block of the number of the variable Y and calculates the difference between the purse data and data included in the instruction given to the purse block. The sequencer then sets this difference to purse data (new purse data) in the new block data. After such processing is performed, it proceeds to the step S54.

When the sequencer judges in the step S49 that the physical block for writing data therein is not a purse block (i.e., is a read/write block), it proceeds to the step S54.

In the step S54, the sequencer 91 sets a number provided by adding one to an incremental counter value of the physical block of the number of the variable Y to an incremental counter value of the new block data. However, when the incremental counter value of the physical block of the number of the variable Y is 11, the sequencer 91 sets the incremental counter value of the new block data to 00.

Next, in a step S55, the sequencer 91 makes a parity arithmetic section 93 calculate parity of each of data to be newly written, the incremental counter and the logic block number, and sets a value of this parity to a value of the parity section of the new block data.

In a step S56, the sequencer 91 stores the new block data (data to be newly stored (the purse data and the execution ID in the case of the purse block), its logic block number, the incremental counter and these parities) in the physical block (write buffer) of the number of the variable W stored in any one of steps S39, S45 and S47.

As mentioned above, the physical block (write buffer) for storing data is selected by utilizing the logic block number and the incremental counter. Thus, when an obstacle is caused during a data writing operation, data of the same logic block number as a logic block number of the data are left in a memory so that no memory corruption is logically caused.

Figure 20:
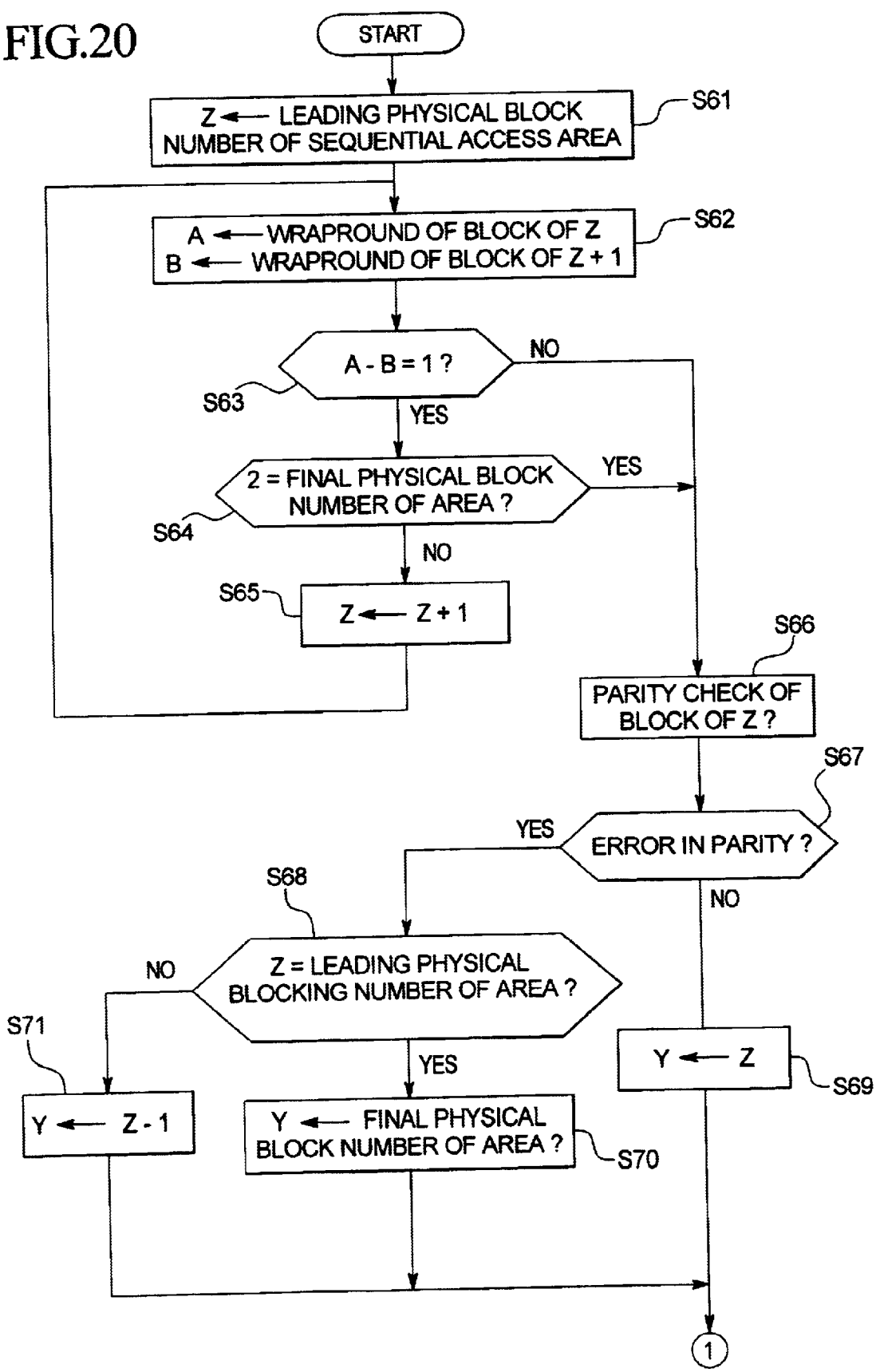
FIG. 20 is a flow chart used for explaining an operation of the IC card 2 at a writing time to the user block of the sequential access area shown in FIG. 8.
Figure 21:
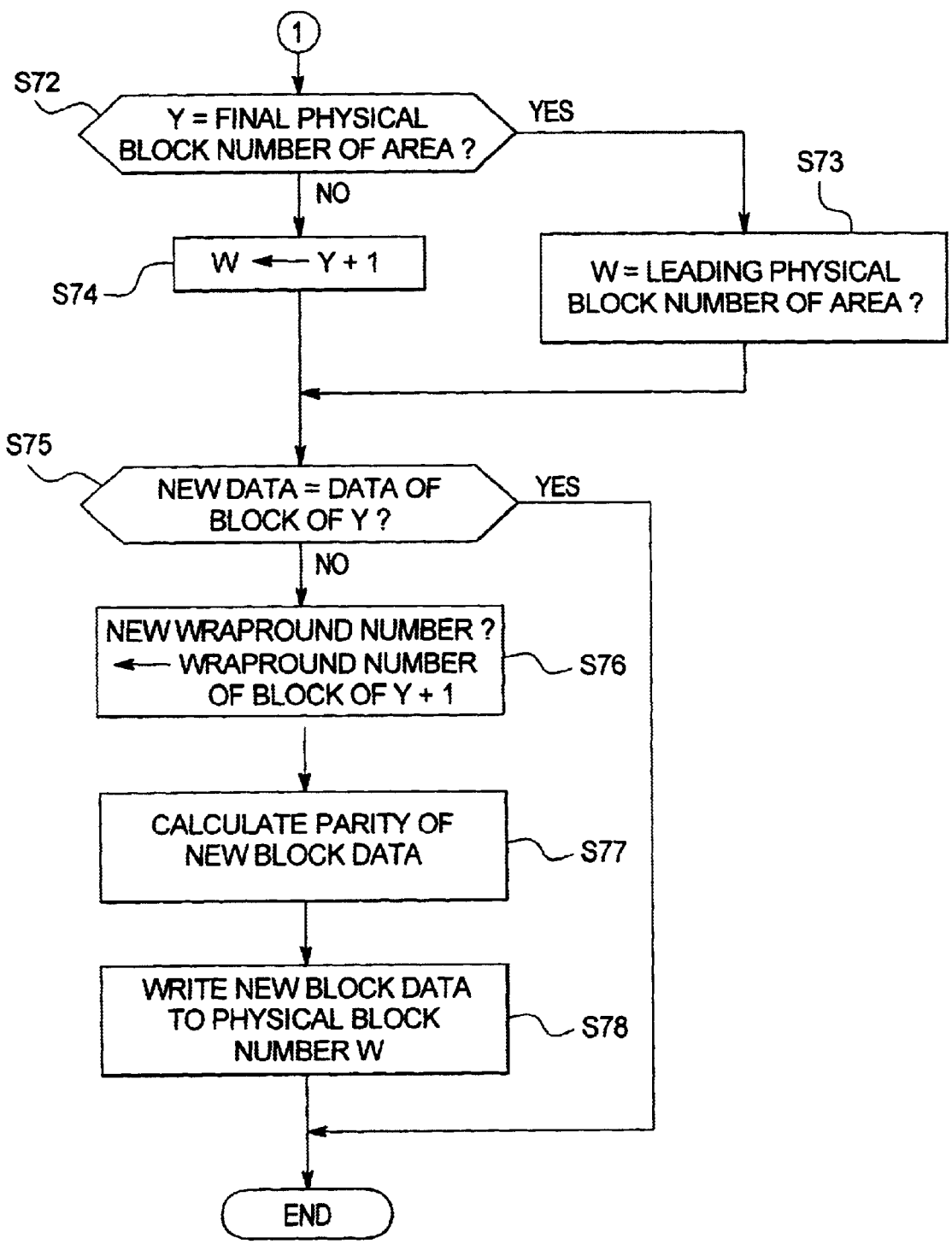
FIG. 21 is a flow chart used for explaining the operation of the IC card 2 at the writing time to the user block of sequential access area shown in FIG. 8.

Next, an operation at a data being written to the sequential access area of the EEPROM 66 will next be explained with reference to the flow charts of FIGS. 20 and 21.

In a step S61, the sequencer 91 stores the number of a leading physical block of the sequential access area in the RAM 67 as a variable Z.

Next, in a step S62, the sequencer 91 reads the wraparound number of a physical block having a physical block number of Z and stores this wraparound number in the RAM 67 as a variable A. Further, the sequencer reads the wraparound number of a physical block having a physical block number of Z+1 and stores this wraparound number in the RAM 67 as a variable B.

In a step S63, the sequencer 91 judges whether the difference (A−B) between values of the variables A and B is one or not. When this difference is not one, the sequencer judges that the physical block of the physical block number Z is a physical block for storing data having a final wraparound number, and it proceeds to a step S66.

In contrast to this, when the sequencer 91 judges that the difference (A−B) between the values of the variables A and B is not one, the sequencer judges in a step S64 whether or not the physical block number Z is equal to the number of a final physical block of the sequential access area. When the sequencer judges that both the physical block numbers are the same, the sequencer judges that the final physical block of the sequential access area is a physical block for storing data having the final wraparound number, and it proceeds to the step S66.

When the sequencer 91 judges in the step S64 that the physical block number Z is not the same as the number of the final physical block of the sequential access area, the sequencer increments the value of the variable Z stored in the RAM 67 by one in a step S65 and it is then returned to the step S62. Then, the processings from the step S62 to the step S65 are sequentially repeated while the value of the variable Z (the value of a physical block number to be retrieved) is being changed.

In this way, the last one oh the wraparound numbers of sequentially stored data is found. In the step S66, the sequencer 91 performs the parity check of a block of the number of the variable Z (=the number of the final physical block of the wraparound number).

In a step S67, the sequencer 91 judges whether a parity error is caused in that physical block or not. When the sequencer judges that the parity error is caused, it proceeds to a step S68.

In the step S68, the sequencer 91 judges whether or not the value of the variable Z is the same as the number of a leading physical block of the sequential access area. When the sequencer judges that the value of the variable Z is the same as that number, the sequencer judges that a final block of data (in which no data causing the parity error are included) is the final physical block of the sequential access area. In a step S70, the sequencer stores the number of the final physical block of the sequential access area in the RAM 67 as a new variable Y and it then proceeds to a step S72 (FIG. 21).

When the sequencer judges that the value of the variable Z is not the same as the number of the leading physical block of the sequential access area, the sequencer 91 calculates the number of the final physical block of data by subtracting one from the value of the variable Z in a step S71. The sequencer 91 stores the calculated value (Z−1) in the RAM 67 as a variable Y and it then proceeds to a step S72.

When the sequencer 91 judges in the step S67 that no parity error is caused, the sequencer stores the number (the value of the variable Z in this case) of the final physical block of data in the RAM 67 as a variable Y in a step S69 and it then proceeds to the step S72.

Next, the sequencer 91 judges in the step S72 whether the number (the value of the variable Y) of the final physical block of data is the sane as the number of the final physical block of the sequential access area or not. When the sequencer judges that these numbers are same to each other, it proceeds to a step S73.

In the step S73, the sequencer 91 sets the number of the leading physical block of the sequential access area to the number of a physical block for writing new data. The sequencer stores this number in the RAM 67 as a variable W and it then proceeds to a step S75.

When the sequencer 91 judges in the step S72 that the number (the value of the variable Y) of the final physical block of data is not the same as the number of the final physical block of the sequential access area, the sequencer sets a number obtained by adding one to the value of the variable Y to the number of the physical block for writing new data in a step S74. The sequencer stores this added number in the RAM 67 as a variable W and it then proceeds to the step S75.

Next, in the step S75, the sequencer 91 judges whether data to be newly stored are the same as those of the physical block (final data) of the number of the variable Y or not. When these data are same to each other, the processing of the sequencer is terminated since the data to be newly stored are already stored.

In contrast to this, when it is judged that the data to be newly stored are not the same as the physical block (final data) of the number of the variable Y, the sequencer 91 reads a wraparound number of the physical block of the number of the variable Y and sets a number obtained by adding one to this wraparound number value to a wraparound number of the data to be newly stored (new block data) in a step S76.

Next, in a step S77, the sequencer 91 makes the parity arithmetic section 93 calculate parity of the wraparound number (new block data) and data to be stored. In a step S78, the sequencer writes the new block data in the physical block of a number W.

In this way, the wraparound number in sequentially stored data is sequentially retrieved and new data are stored in a physical block (or a leading physical block of the sequential access area) next to the final data. Accordingly, when an obstacle is caused during a writing operation of the new data, the data of a wraparound number smaller than that of the data being written are left so that no memory corruption is logically caused.

As mentioned above, the EEPROM 66 can independently provide memory areas to plural providers and is set to restrain occurrence of the memory corruption by utilizing the information of the attribute section.

The same user block can be also allocated to plural providers. In this case, the same user block is allocated by an allocation table of the provider area definition block to which these providers (overlap providers) are registered. At this time, a different access right (read/write or read only)can be set with at every provider respect to the same user block by setting a partition table of the provider area definition block at every provider. Further, a purse block is set to be unused with respect to a predetermined provider and the purse block is set to be used with respect to the other providers so that the predetermined provider can write data to a user data section (read only with respect to the other providers) of the purse block used by the other providers.

Further, the values of areas D0$e$, D0$f$ (normally, an area for storing the version number of a security key therein) of the area definition block are set to a predetermined value (e.g., FFFFH) and a provider code (8 codes at its maximum) of the predetermined provider is stored in areas D10 to D1$f$ of the area definition block so that that provider (a local common provider) can use the user block allocated by the allocation table of the area definition block as a common area.

Further, the local common provider is registered to two area definition blocks allocating the same user block thereto and a different access right is set at every area definition block so that the access right to that user block can be set at every local common provider.

Thus, individual processings can be performed in accordance with plural providers (i.e., R/W) by setting the overlap provider and the local common provider in this way.

As mentioned above, in accordance with the information processing method claimed in claim 1 and the information processing apparatus claimed in claim 3, the command is processed by utilizing a memory section including a first area for storing data of one user or more and a second area used by one user or more stored in the first area and set in a vacant area unused as the first area. Accordingly, the utilization efficiency of the memory can be improved.

In accordance with the information processing method and the information processing apparatus according to one embodiment, a logic block number is allocated to data stored in a physical block, and new data having a predetermined logic block number are stored in a physical block except for the physical block storing the data having this logic block number therein. Accordingly, the occurrence of memory corruption can be logically restrained.

In accordance with the information processing method and the information processing apparatus according to another embodiment, the data of a predetermined block of the second area have a recognition number, and a recognition number given by a command supplied from a user is compared with the recognition number given by the data so as not to repeatedly process the same command. Accordingly, it is possible to prevent each command from being processed plural times in error.

In accordance with the information processing method and the information processing apparatus according to one embodiment, a number corresponding to a storing order is allocated to data stored in a block. Further, when a block having a final number is the final block of an allocated area, new data are stored in a leading block. In contrast to this, when the block having the final number is not the final block, the new data are stored in a block next to the block having the final number. Accordingly, the occurrence of memory corruption can be logically restrained.

In accordance with the information processing method and the information processing apparatus according to one embodiment, a command is processed by utilizing a memory section constructed such that plural data for respectively prescribing different access rights to one user and a predetermined area in a second area are stored in a first area. Accordingly, plural access rights in a predetermined memory area can be given to a predetermined user.

In accordance with an information processing method and an information processing apparatus according to one embodiment, a command is processed by utilizing a memory section constructed such that data for using a predetermined area in a second area by plural users in cooperation with each other are stored to a first area. Accordingly, the same memory area can be allocated to the plural users.

In accordance with the information processing method one embodiment and the information processing apparatus according to another embodiment, a command is processed by utilizing a memory section constructed such that plural data for respectively prescribing different access rights to plural users and a predetermined area in a second area are stored in a first area. Accordingly, different access rights in a predetermined memory area can be given to the plural users.

INDUSTRIAL APPLICABILITY

The present invention can be utilized in a non-contact card system using an IC card.

Explanation of Reference Numbers

1 Reader/Writer
2 IC card

3 Controller
21 IC
23 Modulating circuit
25 Demodulating circuit
27 Antenna
51 IC
52 Capacitor
53 Antenna
61 RF interface circuit
62 BPSK demodulating circuit
63 PLL Unit
64 Arithmetic circuit
65 ROM
66 EEPROM
67 RAM
68 BPSK modulating circuit
81 ASK demodulating unit
82 voltage regulator
83 Oscillator circuit
84 ASK modulating unit
91 Sequencer
92 Encrypting/decrypting Unit
93 Parity calculating unit

What is claimed is:

1. An information processing method comprising the steps:

receiving a command from a user;

processing said command by utilizing a memory section including a first area for storing data of at least one user and a second area used by said at least one user and set in an area unused as said first area, said data of at least one user stored in the first area including block numbers of said second area used by said at least one user, said block numbers including a first block number and a second block number each of which is allocated to data block in the second area, said first and second block numbers corresponding to a first block of an area used by the user and a second number corresponding to a last block of the area, respectively; and transmitting results of said processing.

2. An information processing apparatus comprising:

a receiving means for receiving a command from a predetermined user;

a memory means including a first area for storing data of at least one user and a second area used by said at least one user and set in an area unused as said first area and wherein said data of at least one user stored in the first area includes the position of a first block of said second area used by said at least one user and the position of a last block of said second area used by said at least one user;

processing means for processing said command by utilizing said memory means; and a transmitting means for transmitting results of said processing.

3. An information processing circuit comprising:

an input means for input with an outside signal;

a memory means including a first area for storing data of at least one user and a second area set as to be an area unused as said first area and used by said at least one user and wherein said data of at least one user stored in the first area includes first and second block numbers indicating the position of said second area used by said at least one user the first block number corresponding to a first data block in said second area, and the second block number corresponding to a last data block in said second area;

a processing means for carrying out processing corresponding to said outside signal by utilizing said memory means; and an output means for outputting a result of said processing.

4. An information processing method comprising the steps of:

receiving a command from a user;

processing said command by utilizing a memory section including a first area for storing data of a plurality of users and a second area used by said plurality users and managed in a block unit having a predetermined area in said second area for use by the plural users in cooperation to a first block in said second are and a second are and a second block number corresponding to a last block in said second area.

* * * * *